(12) United States Patent
Kazerooni et al.

(10) Patent No.: US 6,474,711 B2
(45) Date of Patent: Nov. 5, 2002

(54) MECHANICAL GRAPPLE FOR MANIPULATING OBJECTS

(75) Inventors: Homayoon Kazerooni, 2806 Ashby Ave., Berkeley, CA (US) 94705; Christopher Jude Foley, Albany, CA (US)

(73) Assignee: Homayoon Kazerooni, Berkeley, CA (US)

( * ) Notice: Subject to any disclaimer, the term of this patent is extended or adjusted under 35 U.S.C. 154(b) by 0 days.

(21) Appl. No.: 09/876,010

(22) Filed: Jun. 7, 2001

(65) Prior Publication Data

US 2002/0113448 A1 Aug. 22, 2002

Related U.S. Application Data

(63) Continuation-in-part of application No. 09/755,496, filed on Jan. 5, 2000.
(60) Provisional application No. 60/251,931, filed on Dec. 7, 2000.

(51) Int. Cl.⁷ .............................. B66C 1/44; B25J 15/00
(52) U.S. Cl. ........................ 294/86.4; 294/1.1; 271/21; 901/35; 901/38
(58) Field of Search ................................ 294/1.1, 86.4, 294/102.1, 102.2, 103.1, 114, 907; 271/19, 21–23, 109; 414/618, 626; 901/36, 38, 39, 46, 47, 35

(56) References Cited

U.S. PATENT DOCUMENTS

| | | | | |
|---|---|---|---|---|
| 3,197,250 A | * | 7/1965 | Trotta et al. ............. | 294/102.1 |
| 3,239,263 A | * | 3/1966 | Farmer et al. ............. | 294/114 |
| 3,653,708 A | * | 4/1972 | Merola .................... | 294/102.1 |
| 4,181,345 A | | 1/1980 | Achelpohl | |
| 4,226,458 A | | 10/1980 | Achelpohl et al. | |
| 4,549,760 A | | 10/1985 | Minenko et al. | |
| 4,578,013 A | * | 3/1986 | Barillec et al. ............. | 271/21 |
| 4,852,927 A | | 8/1989 | Minenko et al. | |
| 5,303,910 A | * | 4/1994 | McGill et al. ........... | 271/10.01 |
| 5,865,426 A | | 2/1999 | Kazerooni | |
| 5,915,673 A | | 6/1999 | Kazerooni | |

FOREIGN PATENT DOCUMENTS

| | | | | |
|---|---|---|---|---|
| DE | 2749908 | * | 5/1979 | ................... 271/21 |
| JP | 231732 | * | 9/1989 | ................... 271/19 |
| SU | 1611822 | * | 12/1990 | ................... 271/21 |

* cited by examiner

*Primary Examiner*—Dean J. Kramer

(57) ABSTRACT

The invention provides a grapple device and a method for manipulating, i.e., grabbing, holding and releasing objects. The grapple comprises two parallel rollers with gripping surfaces, where the rollers are pushed towards each other with sufficient force to hold a graspable portion of a deformable object. When the grapple comes onto contact with any portion of the deformable object, a signal activates a set of gears causing the rollers to rotate in opposing directions so that a graspable portion of the object is dragged between the rollers. When sufficient material is caught between the rollers, a signal activates a brake automatically stopping the rotation of the rollers, whereby the rollers then hold the graspable portion of the object allowing the object to be moved to a desired location. When the object is properly located, a signal is generated which causes the rollers to rotate in the opposite direction to release the object. The grapple device of the invention provides a control system to generate the signals and operated the grapple.

28 Claims, 16 Drawing Sheets

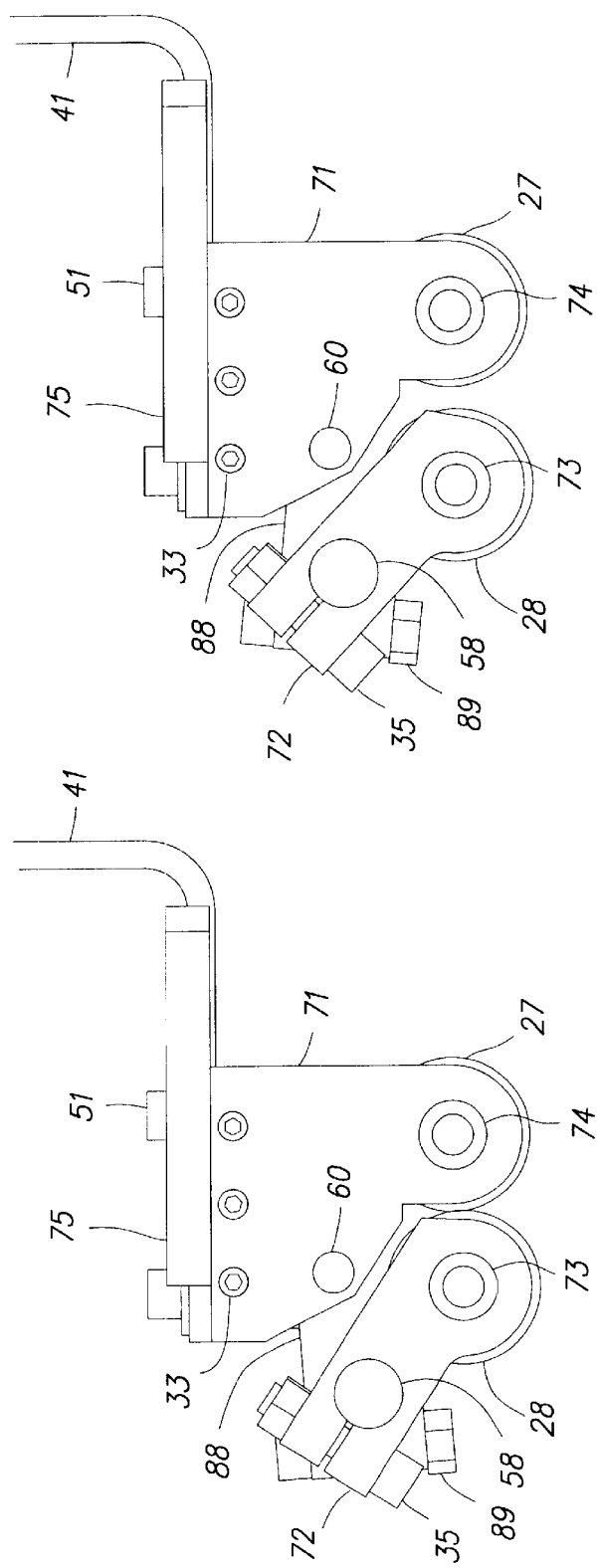

MECHANICAL GRAPPLE FOR MANIPULATING OBJECTS

REFERENCE TO RELATED APPLICATIONS

This application is a CIP of U.S. application No. 09/755,496, filed Jan. 5, 2000 which claims priority to U.S. Provisional Application No. 60/251,931, filed Dec. 7, 2000.

FIELD OF THE INVENTION

This invention relates to material handling devices. More specifically, this invention is a grapple that can be used with robotic or other material handling devices for manipulating, i.e. contacting, grabbing, holding and releasing objects, particularly those having undefined shapes such as sacks and bags.

BACKGROUND OF THE INVENTION

A large number of grapples have been invented for various robotic devices to maneuver solid objects such as boxes and industrial components in manufacturing and production settings. Although quite useful for various industries, these grapples are not able to grab and hold sacks and bags effectively. Postal services across the world use sacks to hold letters, magazines and small boxes. These sacks are handled manually by mail handlers. Most sacks used by US Postal Service (USPS) do not have eyelets, handles or any form of operator interface for grabbing. The shape, size, and the weight of a sack depend on the items in the sack and how the sack is rested on the floor. Sacks fully filled with magazine bundles may weigh up to seventy pounds. The heavy weight of these sacks, the lack of handles, eyelets, or any kind of operator interface on the sacks, and the unpredictable shape and size of the sacks have created awkward and uncomfortable handling situations for U.S. mail handlers particularly at USPS distribution centers. During repeated maneuvers, the awkward sack handling increases the risk of wrist, finger and/or back injuries among mail handlers.

U.S. Pat. No. 4,181,345 (Achelpohl) describes a manually operated clamping device for lifting filled sacks. The device includes a frame supporting a clamping mechanism. The clamping mechanism includes two spaced parallel bars, mounted at their end to two parallel plates and disposed to be rotated in unison about a common parallel axis by a hand-crank. One of the bars is individually rotatable about its own axis and displaceable towards and away from the other bar. To use this device, the gathered top of a filled sack must be manually placed between the two bars. The hand crank is manually operated to wrap the top of the sack around the two bars and clamp it between them. Once secured in the clamping mechanism, the combined clamping device and sack may then be lifted by the device's frame. Unfortunately, this device requires considerable manual manipulation of both the sack and the device.

In an attempt to overcome some of the disadvantages of the device taught in the '345 patent, Achelphol developed a similar device, U.S. Pat. No. 4,226,458 (Achelpohl), in which the clamping bars are mechanically separable and are mounted only at one end to a frame, such that they form parallel cantilever arms. This allows the gathered ends of a sack to be inserted between the clamping bars. The end of the sack is then engaged by mechanically operating the clamping mechanism. Although this device improves the manual operation required by the '345, the device taught in the '458 patent still requires either the gathered end of a sack to be manually placed between the clamping bars, or the sack to be placed on its bottom and the top of the sack gathered, flattened and presented in a proper configuration, so that the device can slideably engage the top of the sack and secure it for lifting.

U.S. Pat. No. 4,549,760 (Minenko et al.) discloses a device for gripping and hoisting packed sacks that utilizes a similar mechanism similar to that of the '458 patent for grabbing, and it has many of the same disadvantages. However, in the device taught in the '760 patent, one of the bars moves relative to the other, with the help of a hydraulic linear actuator. The '760 device still requires the gathered end of a sack to be manually placed between the clamping bars. In this case, the sack is placed on its bottom next to the unpowered bar. The second bar, powered by an actuator, moves around the first bar causing the throat of the sack to be secured in between the bars.

U.S. Pat. No. 4,852,927 (Minenko et al.) describes using two clamping bars to grip and hold the neck of a sack for lifting and transport. The '927 device includes a locking mechanism to secure the clamping bars in a closed position while gripping a sack. However, the '927 device requires that the neck of the sack be manually inserted between the clamping bars, then the device must be manually operated to close and lock the neck of the sack within the device. As a result, the sack cannot be released from the device without first removing the load from the locking mechanism.

All of the devices described in the above patents have the following common characteristics and disadvantages. An operator, prior to grasping, must carefully place the gathered and flattened edge of the sack between two adjacent bars. One of the bars rotates around the other one or both bars rotate along a common parallel axis. The gathered and flattened edge of the sack then raps around the bars. The weight of the sack itself pushes the rods against each other and locks the edge of the sack in between the bars. Additionally, the sack must be placed on its bottom. Since a great deal of operator intervention is required for proper and safe operation, lifting operations using the devices described above are slow. Accordingly, these devices have not been employed by the USPS, and many other distribution centers, where sacks need to be rapidly and repeatedly lifted from a shoot or from a conveyor belt.

Therefore, a need remains in the art, which is met by the present invention, for a device that reduces the amount of manual operator intervention required so that the risk of injuries to workers is minimized and operational efficiency is increased.

SUMMARY OF THE INVENTION

The present invention provides an embodiment of a grapple device and a method for manipulating objects. The embodiment of the grapple of the present invention is mounted to a transport mechanism and provides, for example, a device that can grab a deformable object, such as sacks and bags, wherein (i) the sack does not need to be oriented, (ii) the edges of the sack do not need to be gathered and flattened for grabbing, (iii) no operator intervention is required for grabbing, and (iv) the weight of the sack is not used to lock and secure the sack in the grapple device. The present invention minimizes risk of injuries to workers and increases operational efficiencies.

A preferred embodiment of the present invention provides a grapple device for manipulating, i.e., contacting, grabbing, holding and releasing, objects, wherein the grapple device further comprises (i) a supporting bracket assembly mountable to the transport mechanism; (ii) a first roller, having a roller axis, the roller rotatably mounted on the supporting bracket assembly, and the first roller being rotatable about its axis, wherein the first roller further comprises a gripping surface for engaging and dragging the graspable portion of the object; (iii) a second roller, having a roller axis, and the second roller being rotatable about its axis, wherein the second roller further comprises a gripping surface for engaging and dragging the graspable portion of the object; (iv) a left pivoting bracket assembly and a right pivoting bracket assembly connected to the supporting bracket assembly, having an axis of rotation and rotatably holding the second roller; (v) a biasing means to bias the rollers toward each other with sufficient force to facilitate holding the graspable portion of the object in place between the rollers; (vi) a first gear, rotatably rigidly connected to the axes of the first roller; (vii) a second gear, rotatably rigidly connected to the axes of the second roller; (viii) a third gear, rotatably mounted on the supporting bracket assembly, wherein the third gear mates with the first gear; (ix) a fourth gear, rotatably mounted on the supporting bracket assembly, wherein the fourth gear mates with both the second and third gears and has the same axis of rotation as the left and right pivoting bracket assemblies; and (x) a drive means for rotating the third gear.

As provided in this preferred embodiment, the supporting bracket assembly is mounted to the transport mechanism by a mounting bracket.

The grapple of the present invention further provides that the left and right pivoting bracket assemblies comprise a first clamping bracket and a second clamping bracket, wherein the first clamping bracket comprises a first end rotatably connected to the supporting bracket assembly and a second end pivotally attached to the first end of the second clamping bracket, and wherein the second end of the second holding bracket rotatably holds the second roller.

Additionally, in the preferred embodiment of the grapple of the present invention, when the drive means rotates the third gear in a first direction, the first roller and the second roller rotate in opposite directions, and when the roller surface of the first roller is placed into contact with the graspable portion of the object, the first roller surface draws the graspable portion of the object into a region between the first and the second rollers, thereby grasping the object. The drive means in the preferred embodiment is a motor and a power transmission system to transmit power from the motor to rotate the third gear. Moreover, in this embodiment, the power transmission system comprises a speed reducer transmission coupled to the motor, a drive sprocket connected to the speed reducer transmission, a driven sprocket connected to rotate the third gear and a chain connecting the driver and driven sprockets.

Furthermore, the preferred embodiment the grapple of the present invention also provides a holding means, preferably a brake, selectively operable to releasably engage at least one of the rollers, and prevent rotation of the roller when engaged, so that when the graspable portion of the object is located in the region between the rollers and the holding means is engaged, the contact between the graspable portion of the object and the first and second rollers causes the object to be held by the device.

Finally, a preferred embodiment the grapple of the present invention also provides when the drive means rotates the third gear in a second direction, the first roller and the second roller turn outwardly, releasing the object.

In addition, the biasing means to bias the rollers toward each other in the preferred embodiment is a spring. Also, in the preferred embodiment of the present invention, the gripping surface of the rollers is covered with a material with a high coefficient of friction, preferably rubber.

The preferred embodiment of the present invention also provides a control system, which following contact with a deformable object, controls the three operational phases of the grapple: grab, hold and release. The control system comprises a signal generating element, preferably a proximity switch, that generates a signal when the grapple is close to an object. The control system further comprises a signal generating element, preferably an electromechanical switch, that generates a signal when a sufficient portion of the object is collected between the rollers. Finally, the control system further comprises a signal generating element, preferably a momentary switch pressed by an operator, that generates a signal to release the object.

The present invention also provides a method of manipulating an object comprising (i) mounting the grapple device described above to a transport mechanism, (ii) positioning the grapple device close to the object, (iii) activating the grabbing operation of the grapple device, (iv) stopping the rotation of the rollers automatically when a sufficient portion of the object is grabbed between the rollers, thereby holding the object, (v) maneuvering the grapple device and object, via the transport mechanism, to the desired location, and (vi) releasing the object from the grapple device. The method further comprises releasably engaging at least one of the rollers to prevent rotation of the roller when engaged, so that when the graspable portion of the object is located between the rollers, the contact between the graspable portion of the object and the first and second rollers causes the object to be held by the grapple. Additionally, the method of manipulating an object of the present invention further comprises, (i) generating a signal when the grapple is close to an object, (ii) generating a signal when a sufficient portion of the object is collected between the rollers, and (iii) generating a signal to release the object.

DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown.

FIG. 3A shows a perspective front view; and FIG. 3B shows a perspective rear view.

FIG. 4A shows a partial view with the rollers and gears removed; FIG. 4B shows a partial view with the rollers and two gears removed; FIG. 4C shows a partial view with the rollers removed; and FIG. 4D shows a perspective view from beneath the left side of the grapple with the rollers and gears in place.

FIGS. 5A and 5B illustrate a side view of the right side of an embodiment of the grapple of the present invention. FIG.

5A shows the grapple when rollers are moved close to each other, and FIG. 5B shows the grapple when rollers are moved away from each other.

FIG. 6A shows the grapple with no sack material held in the grapple; FIG. 6B shows the grapple with a portion of a sack held between the rollers.

FIG. 7A shows a perspective view in simple form; FIG. 7B shows a cross-sectional view of the grapple showing the mechanism that activates the switch; and 7C shows a cross-sectional view of the grapple showing the mechanism where a portion of a sack is held between the rollers and the switch has been activated.

FIG. 10A shows a perspective front view; and FIG. 10B shows a perspective rear view.

DESCRIPTION OF PREFERRED EMBODIMENT OF THE INVENTION

Figure 1C:
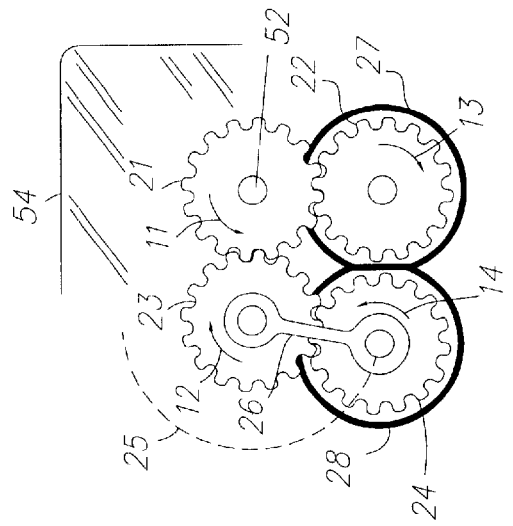
FIGS. 1A, 1B and 1C schematically illustrate the basic underlying principle of operation of the grapple of the present invention.

The description contained herein relates to a form of a mechanical grapple for manipulating, i.e., grabbing, holding, and releasing objects as presently contemplated. This description, however, is intended to be illustrative only and not limiting as to the scope of the present invention. Referring now to the drawings, the details of an embodiment of the invention are graphically and schematically illustrated. Like elements in the drawings may be represented by like numbers. "Manipulating" is herein defined to mean a combination of the activities of grabbing, holding and releasing or any part thereof. The activities defined by manipulating occur after the grapple has come in contact with an object.

Figure 1B:
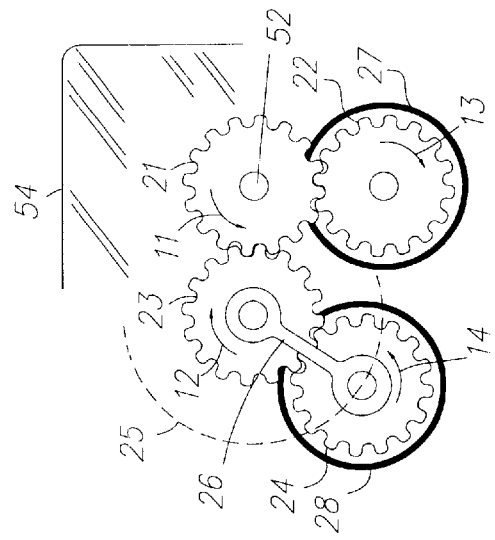
Figure 1A:
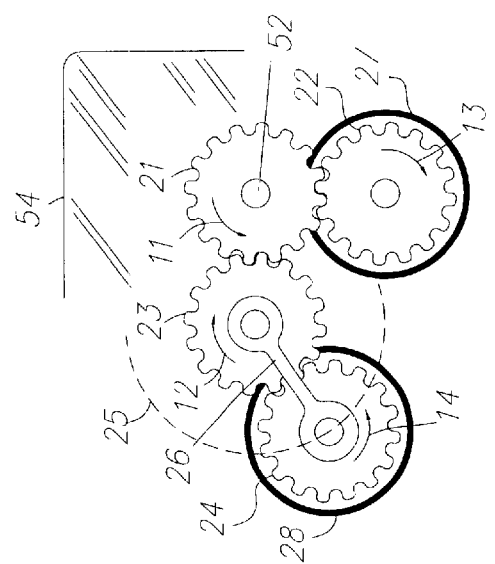

FIGS. 1A, 1B and 1C depict the basic architecture of the grasping mechanism of the grapple of the present invention that is used to grab sacks and bags. The grasping mechanism engages a graspable portion of the object. A "graspable portion of the object" is herein defined to mean the portion of the object the grapple contacts (e.g., sack material). As shown in FIG. 1A, the grasping mechanism further comprises four gears. Gear 21, secured to input shaft 52, is powered by an actuator (actuator is not shown in FIGS. 1A, 1B and 1C). The actuator is able to turn both clockwise and counter-clockwise. Arrow 11 illustrates when gear 21 is powered to turn counter-clockwise. Gear 21 is in contact with two gears 22 and 23, where both gears turn clockwise as shown by arrows 12 and 13. Bracket 54 holds the axes of the three gears 21, 22 and 23 such that the gears are free to rotate, but their axes cannot move relative to one another. Gear 24 is in contact with gear 23, and therefore turns counter-clockwise as shown by arrow 14. Link 26, while holding gear 24, turns independently of the rotation of gear 23. In other words, link 26 is able to position the axis of gear 24 at any point on the dashed line 25 regardless of the rotation of the gears.

As shown in FIG. 1A, gears 22 and 24 always turn in opposite directions. Two rollers 27 and 28 are rigidly connected to two gears 22 and 24, wherein the rollers turn along their own axes, but in opposite directions relative to each other. In a preferred embodiment of the invention, the rollers are cylindrical in shape. FIGS. 1B and 1C show two configurations where link 26 has turned counter-clockwise and brought gear 24 closer to gear 22. The rotation of link 26 along dashed line 25 allows rollers 28 and 27 to come in contact with each other or separate from each other. FIG. 1C shows a configuration where link 26 has turned counter-clockwise, causing rollers 27 and 28 to be pushed against each other. In order to push the two rollers 27 and 28 against each other without an active force-generating element, a spring (not shown) is installed between link 26 and left vertical bracket 54 to rotate link 26 counter-clockwise. Even though the spring is not shown in FIGS. 1A–1C, it would be apparent to one skilled in the art, that there are many ways to install a spring to push link 26 counter-clockwise. A preferred embodiment for the installation of a spring where the operator can adjust the contact force between the rollers is discussed later.

Figure 2:
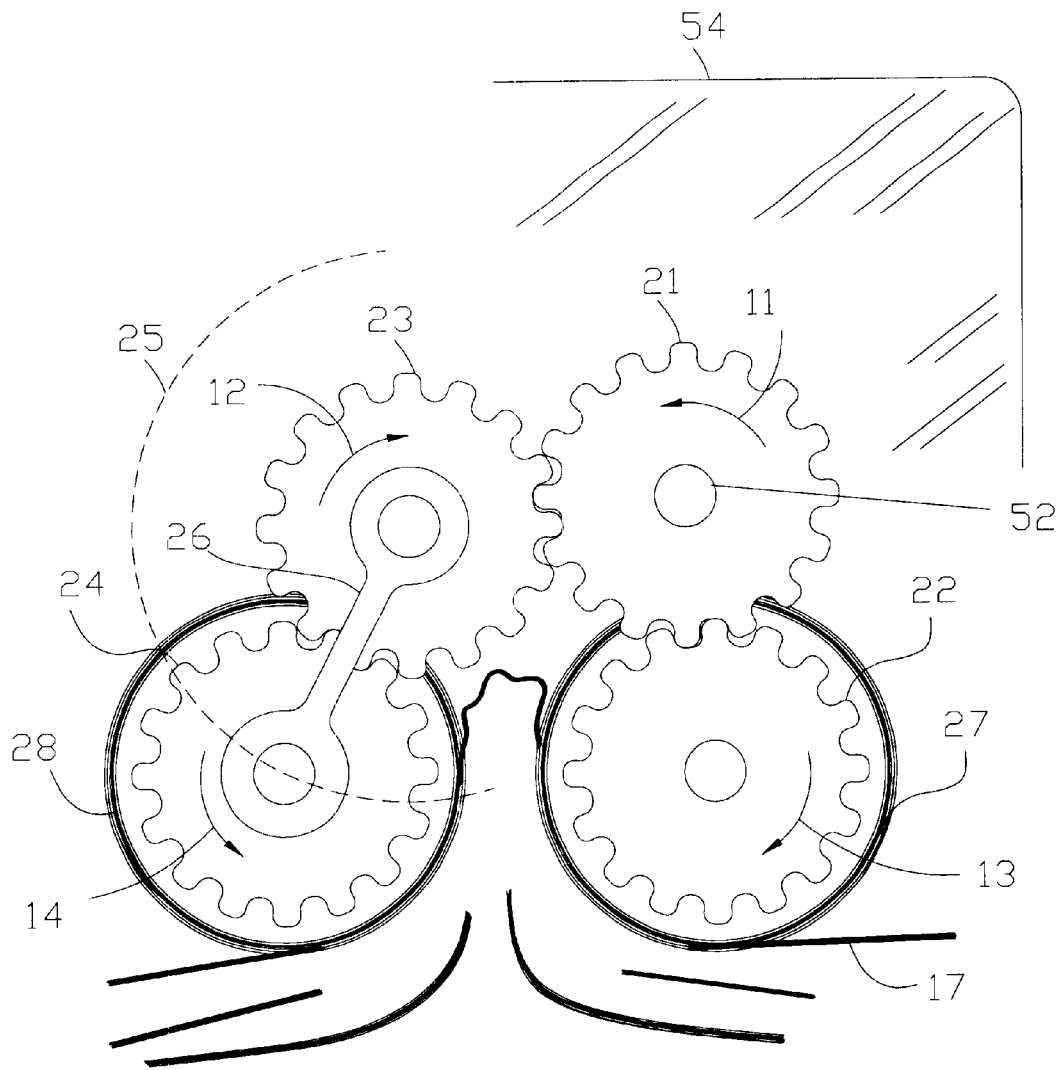
FIG. 2 schematically illustrates the mechanism of the grapple of FIGS. 1A, 1B and 1C where a sack has been grabbed and held by the grapple.

As the rollers turn in a first direction, roller 27 turns clockwise and roller 28 turns counter-clockwise, the sack material 17 is dragged between rollers 27 and 28 (shown in FIG. 2). For good contact between the rollers and sack material 17, both rollers are preferably covered by material with a large coefficient of friction such as rubber. In a preferred embodiment of the invention, Neoprene is used.

If rollers 27 and 28 have equal diameters, their angular velocities must be equal so no sliding motion can occur between the rollers. To ensure equal angular velocities for rollers 27 and 28, gears 22 and 24 must be chosen such that $n_{22}=n_{24}$ where $n_{22}$ and $n_{24}$ represent the number of teeth on gears 22 and 24. If rollers 27 and 28 have unequal diameters, gears 22 and 24 must be chosen such that $R_{28} \times n_{22} = R_{27}$ where $R_{28}$ and $R_{27}$ are the radii of rollers 27 and 28. In general, rollers 27 and 28 must have equal linear velocities at their outer surfaces so no sliding motion can occur between the rollers.

When sufficient sack material 17 is grabbed between rollers 27 and 28, the grapple control system will stop the rollers and keep them stationary. When the gears are locked so zero angular speed is generated for the rollers, sack material 17 is secured between the rollers and the sack is maneuvered by handling bracket 54 of the grapple. As long as rollers 27 and 28 are pushed tightly together by a spring and the coefficient of friction between sack material 17 and rollers 27 and 28 is sufficiently large, the sack will not slide out.

The sack is released when the rollers turn in a second direction, wherein roller 27 turns counter-clockwise and roller 28 turns clockwise, pushing the sack material from between the rollers. An alternative method of releasing the sack material is to separate rollers 27 and 28 from each other.

Figure 3A:
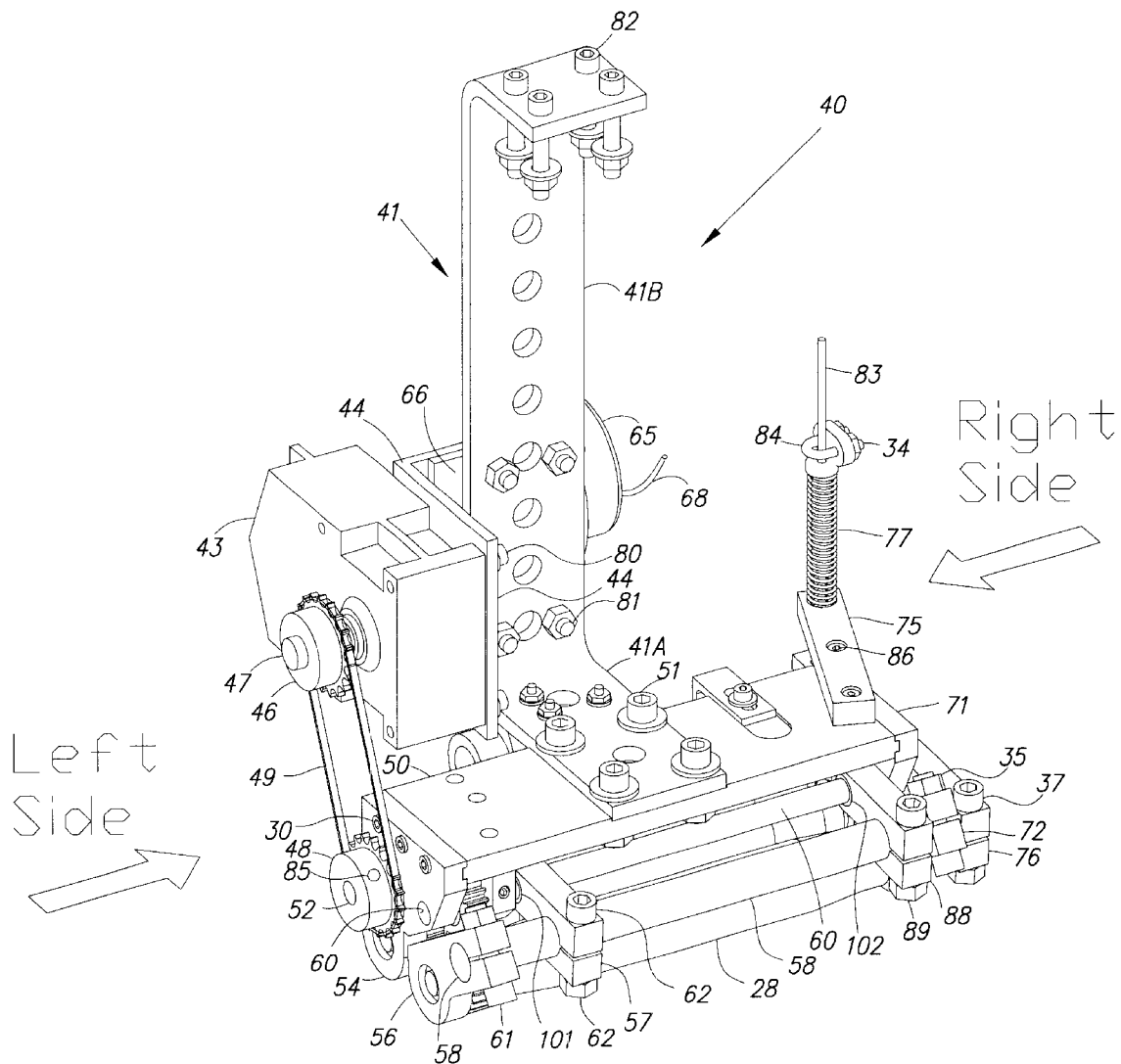
FIGS. 3A and 3B illustrate an embodiment of the grapple of the present invention.
Figure 3B:
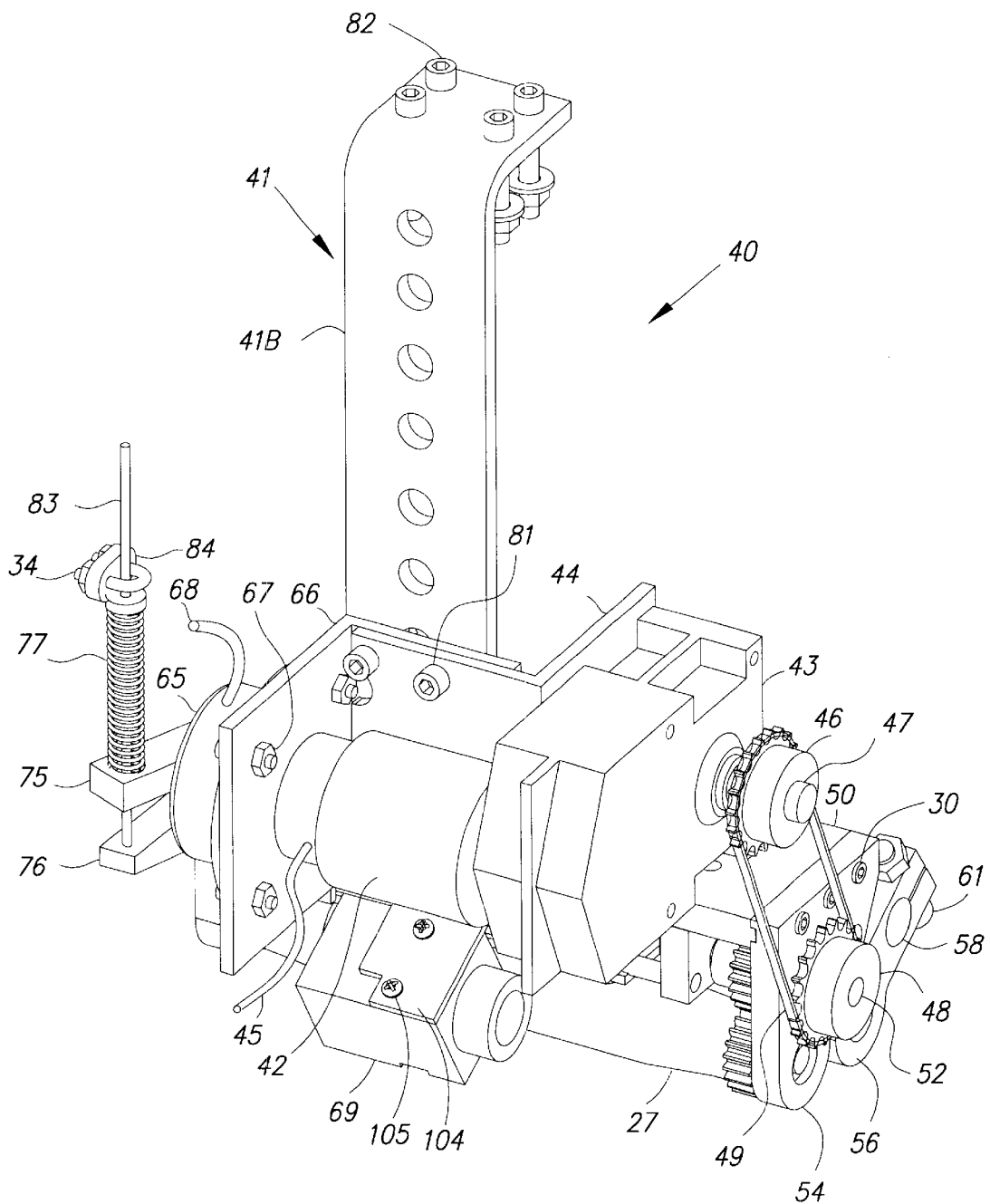

FIGS. 3A and 3B show two different views of a preferred embodiment of the grapple 40 where the grasping mechanism shown in FIGS. 1A, 1B, 1C and 2 is adopted. A mounting bracket 41 supports the major components of the grapple 40. Although it could be of any shape, as would be apparent to one skilled in the art, in this embodiment, for the sake of saving weight and volume, an L-shape was used for the construction of mounting bracket 41. Four fasteners 82 are used to connect grapple 40 to the end point of a robot or a material-handling device. A supporting bracket assembly is installed on the horizontal section 41A of L-shape mounting bracket 41 via four fasteners 51 and supports the entire grasping mechanism described in FIGS. 1A, 1B, 1C and 2. The supporting bracket assembly comprises a horizontal plate 50, a left vertical bracket 54, and a right vertical bracket 71.

As shown in FIG. 3B, the actuator that turns the rollers comprises a motor 42 coupled to a speed reducer transmission 43. Speed reducer transmission 43 is secured onto a transmission bracket 44 via four fasteners 80. Transmission bracket 44 is connected to the vertical section 41B of L-shape mounting bracket 41 via four fasteners 81. In a preferred embodiment, motor 42 is a single-phase 0.2 HP motor, which is powered by a 12 VDC power supply via a power cable 45. Additionally, in a preferred embodiment, the speed reducer transmission 43 has a speed ratio of 36, and the output torque at 180 RPM is 70 lbf-in.

A brake 65 is installed on a brake bracket 66 via four fasteners 67. Brake bracket 66 is also connected to vertical section 41B of L-shape mounting bracket 41 via four fasteners 81. In a preferred embodiment brake 65 is powered by a 12 VDC power supply via a power cable 68 and is engaged to the shaft of electric motor 42. When brake 65 is not powered electrically, it is engaged, preventing the motor shaft from turning. When brake 65 is electrically powered, it is not engaged and the motor shaft is free to turn. In a preferred embodiment, brake 65 is manufactured by Inertia Dynamics and produces 7lbf-inch of braking torque.

A driver sprocket 46 is secured to transmission output shaft 47 of speed reducer transmission 43. The rotation of driver sprocket 46 drives a driven sprocket 48 via a chain 49. The driven sprocket 48 is secured to input shaft 52 via a setscrew 85 (setscrew 85 cannot be seen in FIG. 3B, refer to FIG. 3A). Input shaft 52 turns underneath horizontal plate 50 as driver sprocket 46 and driven sprocket 48 turn. As would be apparent to one skilled in the art, other means to connect driven sprocket 48 to input shaft 52 may be used such as, a split taper bushing or a roll pin, to ensure that driven sprocket 48 and input shaft 52 are totally secured to each other. Likewise, as would be apparent to one skilled in the art, other mechanisms such as belts, pulleys, and combinations of gears could be used instead of chain 49 and sprockets to rotate input shaft 52.

Left vertical bracket 54, secured perpendicularly to horizontal plate 50 via fasteners 30, holds input shaft 52 via a ball bearing (not shown in FIGS. 3A and 3B). The entire grasping mechanism depicted schematically in FIGS. 1A, 1B, 1C and 2 (including four gears 21, 22, 23 and 24) is installed underneath of horizontal plate 50 and is powered by input shaft 52. Accordingly, input shaft 52 of FIGS. 3A and 3B is the same as input shaft 52 of FIGS. 1A, 1B, 1C and 2. Moreover, left vertical bracket 54 of FIGS. 3A and 3B is the same as left vertical bracket 54 of FIGS. 1A, 1B, 1C and 2.

Figure 4A:
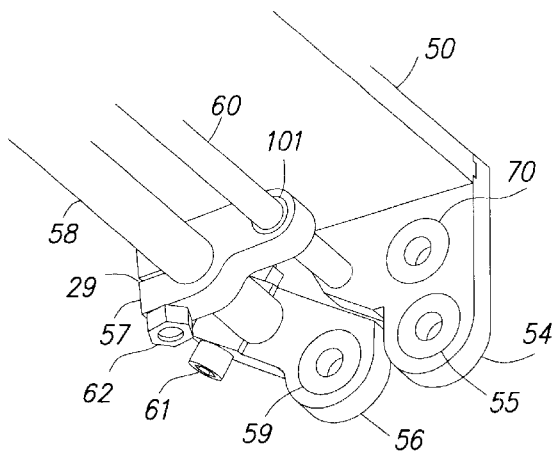
FIGS. 4A, 4B, 4C and 4D show a view from beneath the left side of an embodiment of the grapple of the present invention.

FIGS. 4A, 4B, 4C and 4D show partial views from beneath horizontal plate 50, behind left vertical bracket 54, where the grasping mechanism described in FIGS. 1A, 1B, 1C and 2 is housed. As shown in FIG. 4A, where most components have been removed, a left pivoting bracket assembly, comprising two clamping brackets 56 and 57, performs the function of link 26 shown in FIG. 2. A shaft 60 is secured to left vertical bracket 54 by press fit, and therefore does not rotate relative to left vertical bracket 54. A clamping bracket 57, comprising a pinch slot 29, is secured to a shaft 58 via a clamping fastener 62. A bearing 101 located between shaft 60 and clamping bracket 57, allows for rotation of clamping bracket 57, and consequently shaft 58, around the axis of shaft 60. Note that shafts 60 and 58 are parallel to one another. A clamping bracket 56 is also secured to shaft 58 via a clamping fastener 61. Clamping bracket 56, shaft 58 and clamping bracket 57 are rigidly connected together and rotate together on shaft 60. Bearing 101, between shaft 60 and clamping bracket 57 allows for this smooth rotation. This rotation permits movement of clamping bracket 56 relative to left vertical bracket 54. Clamping bracket 56, shaft 58 and clamping bracket 57, taken together, play the same role as link 26 plays in FIG. 2; that is, they move ball bearing 59 relative to ball bearing 55. Ball bearings 59 and 55 are installed on clamping bracket 56 and left vertical bracket 54 respectively, and they hold the ends of two rollers needed for grabbing the sack material.

Figure 4B:
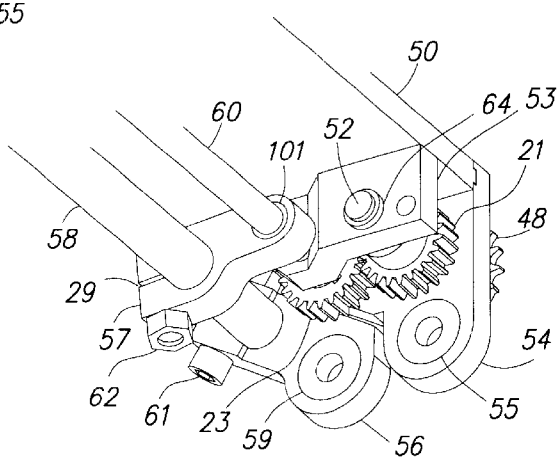

As shown in FIG. 3A, driven sprocket 48 is secured to input shaft 52 via a setscrew 85 or the like. As shown in FIG. 4B, input shaft 52 is also secured rigidly to gear 21 with a roller pin or the like. A bracket 53, secured to shaft 60 and horizontal plate 50, holds the inner end of input shaft 52 via a bearing 64 and left vertical bracket 54 holds the outer end of input shaft 52 via a ball bearing 70 (shown in FIG. 4A only). Accordingly, input shaft 52, gear 21 and driven sprocket 48 turn together while being held by bearing 64 and ball bearing 70. Also note that gear 23 mating with gear 21 turns on shaft 60. A bearing (not shown) located between shaft 60 and gear 23 allows for rotation of gear 23 on shaft 60.

Figure 4C:
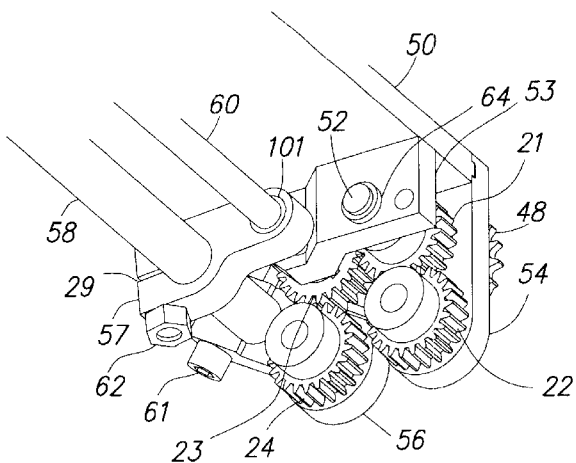

As described above, gears 21 and 23 turn in opposite directions relative to each other. Clamping bracket 56, holding ball bearing 59, can move relative to left vertical bracket 54. As shown in FIG. 4C, gears 22 and 24 are in contact with gears 21 and 23, and turn in opposite directions relative to each other. Due to the motion of clamping bracket 56 relative to left vertical bracket 54, gear 24 comes close to gear 22, but never makes contact with gear 22. In other words, gears 22 and 24 are never engaged with each other.

Figure 4D:
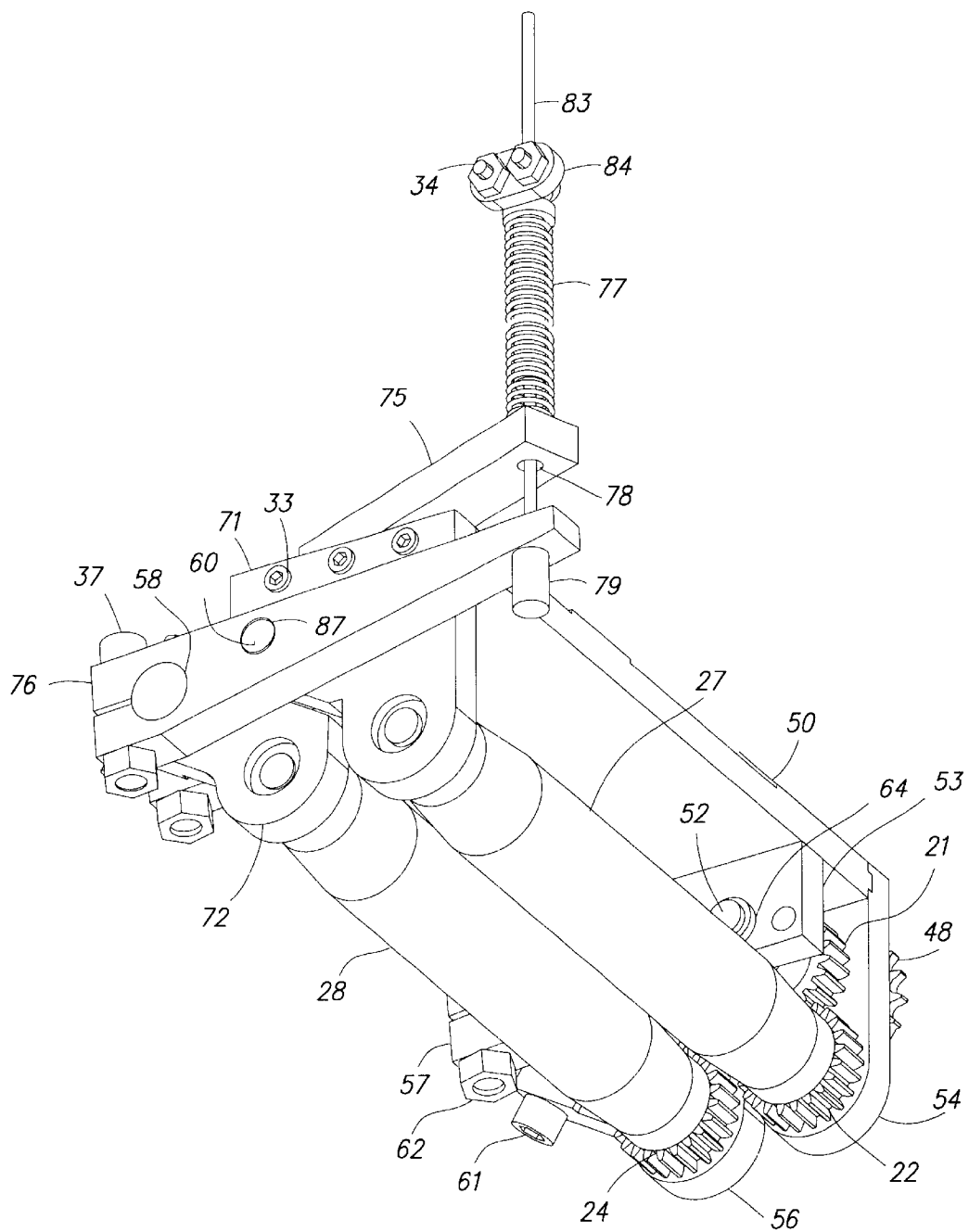

As shown in FIG. 4D rollers 27 and 28 are rigidly connected to gears 22 and 24, and therefore turn in opposite direction relative to each other. As depicted in FIG. 4A, clamping bracket 56, shaft 58 and clamping bracket 57, taken together, are rigidly connected and rotate together around the axis of shaft 60 on bearing 101. This rotation allows the axis of roller 28 to move relative to the axis of roller 27 while they are both spinning, in opposite directions, along their own axes.

FIGS. 5A and 5B further describe the nature of the movement of rollers 27 and 28 relative to each other while spinning about their own axes. FIGS. 5A and 5B show the right side of grapple 40. This side of the grapple is similar to the left side, but it does not have any gears or chains for power transfer. A right pivoting bracket assembly, consisting of two clamping brackets, is similar to the left pivoting bracket assembly. A right vertical bracket 71 and a clamping bracket 72 on the right side of the grapple are similar to left vertical bracket 54 and clamping bracket 56 on the left side of the grapple. Right vertical bracket 71 is secured onto horizontal plate 50 via three fasteners 33. Horizontal plate 50 cannot be seen in FIG. 5A and FIG. 5B. Ball bearings 73 and 74, located symmetrically relative to ball bearings 59 and 55 (shown in FIG. 4A) hold rollers 28 and 27. Shaft 58 is secured in clamping bracket 72 via a clamping fastener 35. Shaft 60 is secured to right vertical bracket 71 by press fit. Clamping bracket 88, which is symmetrically located relative to clamping bracket 57 (shown in FIG. 4C), is secured to shaft 58 by clamping fastener 89 (not shown in FIGS. 5A and FIG. 5B; refer to FIG. 3A). Clamping bracket 72, shaft 58 and clamping bracket 88, taken together, are rigidly connected, and rotate together around the axis of shaft 60. Bearing 102 (shown in FIG. 3A), symmetrical to bearing 101, is located between bracket 88 and shaft 60. This rotation, as discussed above, allows the axis of roller 28 to move relative to the axis of roller 27, as shown in FIG. 5B.

FIG. 5B shows the grapple in a configuration where clamping brackets 72 and 88 on the right side of the grapple and clamping brackets 56 and 57 on the left side of the grapple and shaft 58, together have turned along axis of shaft 60, in the clockwise direction. This motion has caused the axis of roller 28 to move away from the axis of roller 27. Note that the motion of the rollers relative to each other is independent of their spinning motion. In other words, each roller spins on its own axis, but it can also move relative to the other roller in a non-rotatable direction. Moreover, no sliding motion would occur between the rollers if the rollers contact each other since the rollers, in this embodiment, have equal radii and they both turn with equal angular velocities.

Figure 6B:
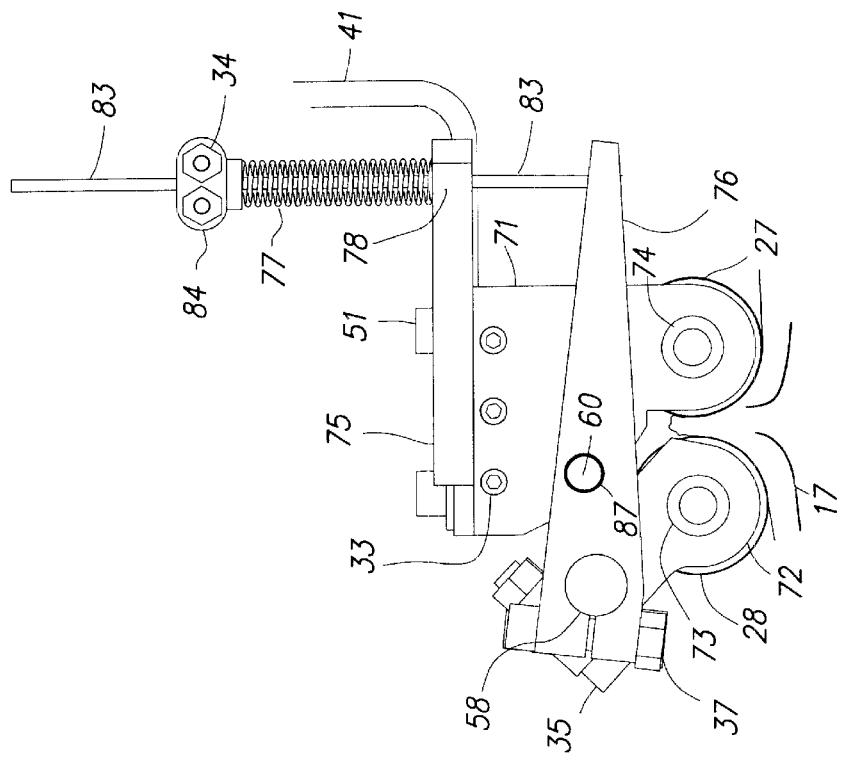
FIGS. 6A and 6B illustrate a side view of the right side of an embodiment of the grapple of the present invention, wherein a spring is installed to push the rollers against each other.
Figure 6A:
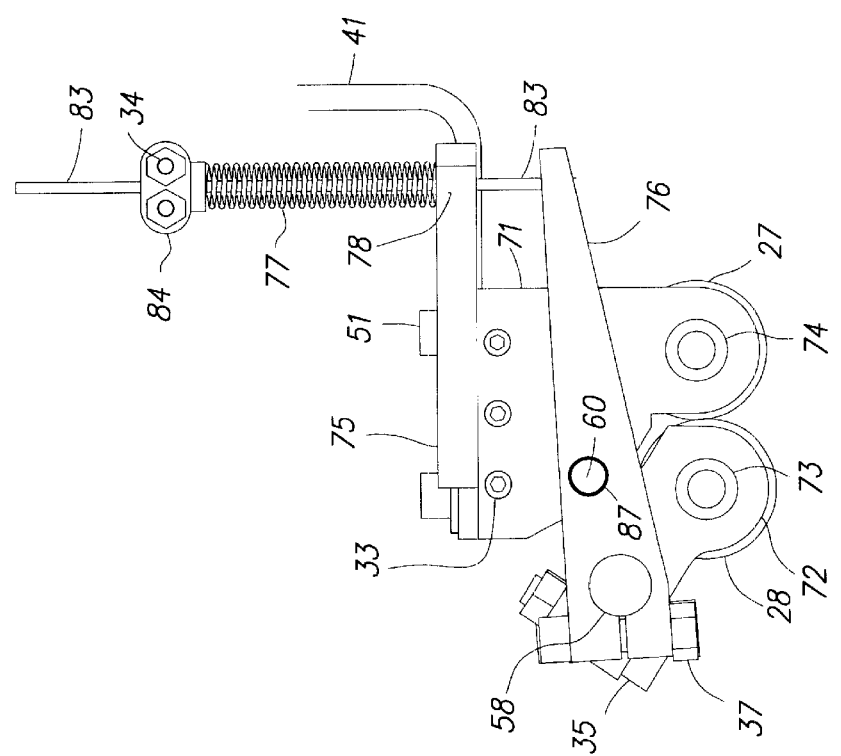

FIGS. 6A and 6B illustrate the mechanism that pushes the rollers against each other. FIG. 6A is the same as FIG. 5A with an upper bracket 75 and a lower bracket 76 added to the grapple to install a spring 77. Upper bracket 75 is secured to horizontal plate 50 by two fasteners 86 (shown in FIG. 3A). Lower bracket 76 is secured to shaft 58 by clamping fastener 37 and turns on shaft 60 via a bearing 87. The counter-clockwise rotation of lower bracket 76 on shaft 60 moves clamping bracket 72 and roller 28 closer to right vertical bracket 71 and roller 27. Spring 77 imposes counter-clockwise torque on lower bracket 76 and therefore pushes roller 28 against roller 27. A wire rope 83 passes through spring 77 and a hole 78 in upper bracket 75 and is secured to lower bracket 76. A clamp 84 is secured to the upper end of wire rope 83 by fasteners 34. The clamp secures wire rope 83 to the upper end of spring 77. Spring 77 can be preloaded by moving clamp 84 along wire rope 83. As clamp 84 is lowered, more compression force is created in spring 77. The generated tensile force in wire rope 83 rotates lower bracket 76 on shaft 60 counter-clockwise. This causes roller 28 to be pushed against roller 27 as shown in FIG. 6A The higher the compression force created in spring 77, the more roller 28 is pushed against roller 27. Similar compression is created in alternative embodiments of the invention, wherein other recognized means of creating the torque are used in place of the spring and wire rope assembly.

FIG. 6B shows the grapple configuration where sack material 17 has been grabbed between rollers 27 and 28 and has caused clockwise rotation of lower bracket 76 around shaft 60. As would be apparent to one skilled in the art, there are many methods of using a spring to push roller 27 against roller 28. In a preferred embodiment, a long spring was used because the movement of the rollers relative to each other when a sack is grabbed between them will cause very little variation in the normal force between the rollers. It is desirable, but not necessary, to create a fairly constant force between the rollers when they move relative to each other due to the sack material. Additionally, as would be apparent to one skilled in the art, there are other methods of pushing the rollers against each other. For example, one could use active force generating components such as an electric solenoid or motor to force the rollers against each other. Similarly a pneumatic translational actuator (known as pneumatic cylinder) can be used to push the rollers against each other.

Power is transferred to rollers 27 and 28 as shown in FIG. 3B. Electric motor 42 is coupled to a speed reducer transmission 43. The output shaft of speed reducer transmission 43 is secured to driver sprocket 46. Driver sprocket 46 turns driven sprocket 48 via chain 49. The transmission system and motor are secured to transmission bracket 44 via fasteners 80. The transmission bracket 44 is secured to L-shape mounting bracket 41 via fasteners 81. A brake 65 is installed on brake bracket 66 of grapple 40. Brake bracket 66 is also connected to L-shape mounting bracket 41 via fasteners 81.

Figure 7A:
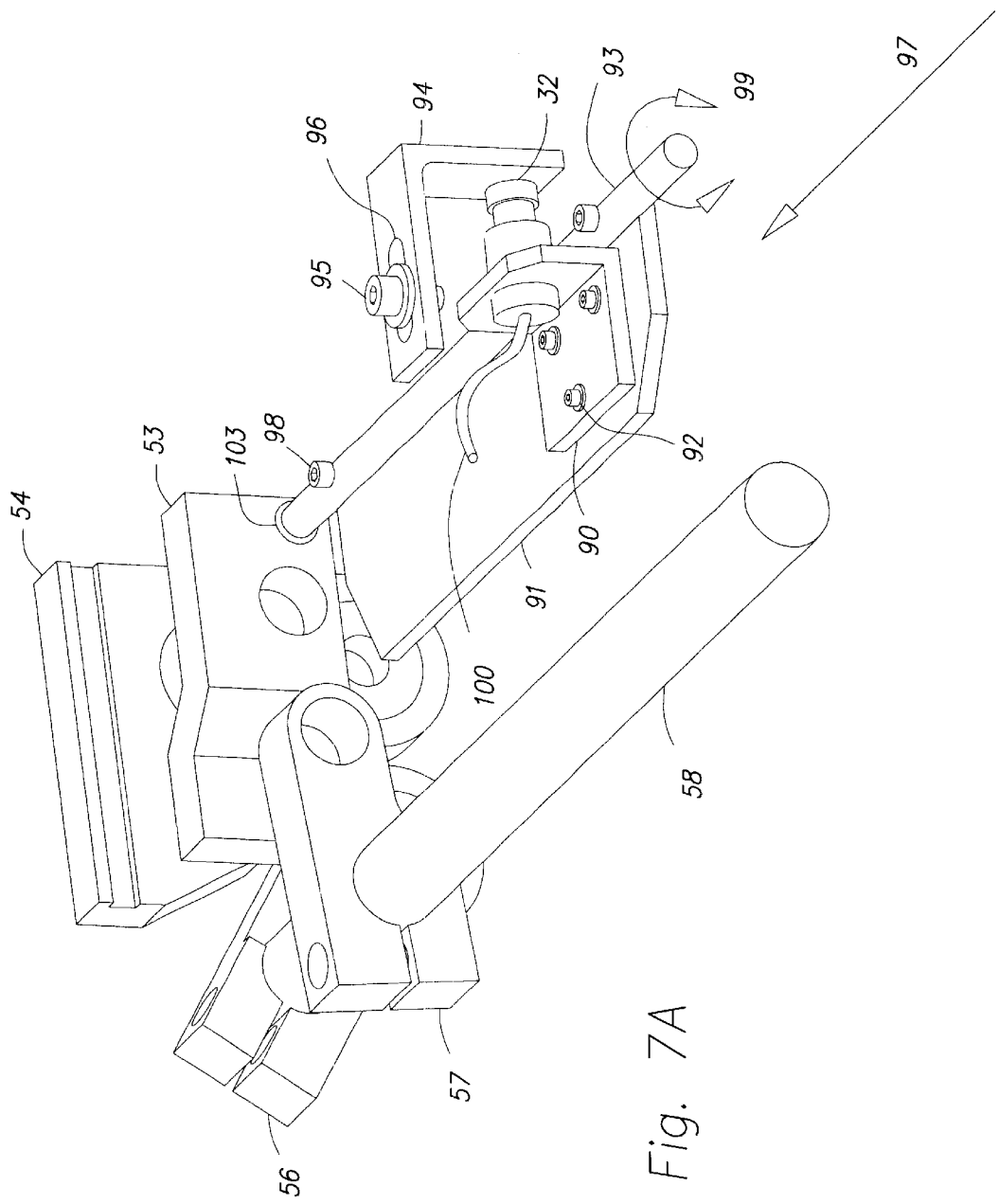
FIGS. 7A, 7B and 7C illustrate an embodiment of the present invention with a switch that issues a signal when enough sack material has been collected between the grapple rollers.
Figure 7B:
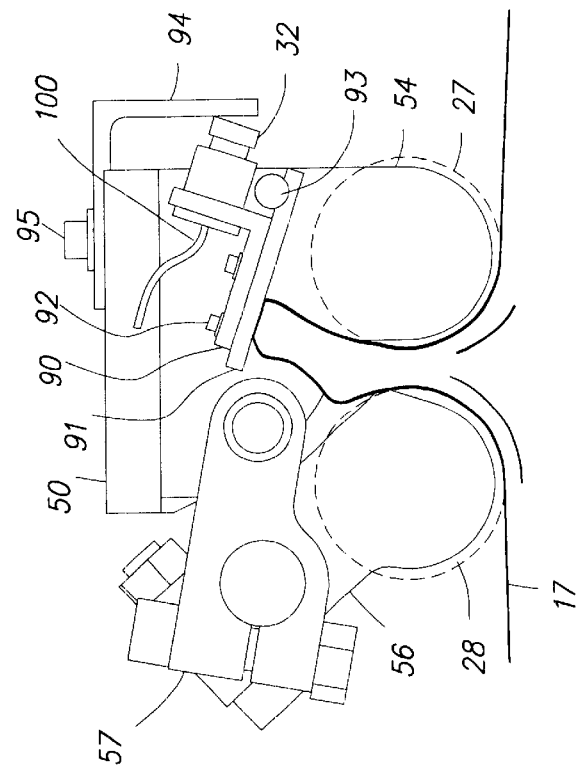
Figure 7C:
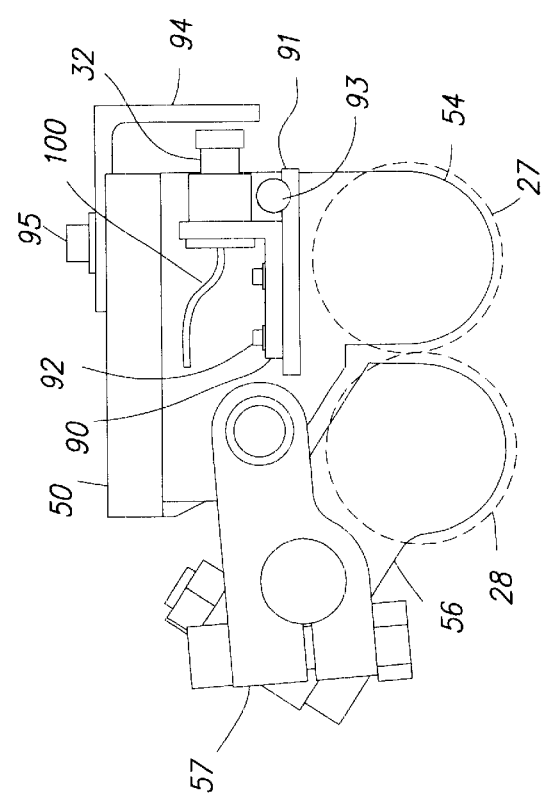

When enough sack material has been collected between the rollers to lift and transport the sack, the rollers are stopped. In a preferred embodiment, a switch is installed to issue a signal when enough sack material 17 has been dragged in the region between the rollers. FIG. 7A shows a perspective view of the grapple where horizontal plate 50 has been removed for clear illustration of the switch location. FIGS. 7B and 7C show grapple 40 from the direction shown by arrow 97 in FIG. 7A. In a preferred embodiment, a momentary switch 32, installed on an angle bracket 90, is activated when enough sack material 17 is gathered in between the rollers. Angle bracket 90 is secured to swivel plate 91 via three fasteners 92. Swivel plate 91 is rigidly connected to swivel shaft 93 via two fasteners 98 (shown in FIG. 7A only). Swivel shaft 93 is free to rotate around its own axis (i.e., in the direction of arrow 99 in FIG. 7A). Swivel shaft 93 is held at one end by bracket 53 with bearing 103 and at the other end by right vertical bracket 71. (Note that only bracket 53 with bearing 103 is shown in FIG. 7A).

A stationary angle bracket 94 is secured to horizontal plate 50 via fasteners 95 (note that horizontal plate 50 is removed in FIGS. 7A and 7B). FIG. 7B shows the grapple when swivel plate 91 is in its neutral position and momentary switch 32 is not activated. FIG. 7C shows the grapple when swivel plate 91 has turned in the clockwise direction due to the force from sack material 17 and momentary switch 32 is pressed against stationary angle bracket 94. A slot 96 shown in FIG. 7A, created on stationary angle bracket 94, allows for small adjustments of the position of stationary angle bracket 94 relative to horizontal plate 50. This adjustment is necessary so that rotation of swivel plate 91 along arrow 99 causes momentary switch 32 to be pressed against stationary angle bracket 94. The more stationary angle bracket 94 is moved toward the right hand side, the more swivel plate 91 has to turn (in the clockwise direction) to press momentary switch 32 against stationary angle bracket 94. The signal generated by momentary switch 32 is carried out via signal cable 100.

In another embodiment, a switch is installed on the grapple that is activated by separation of the rollers. Accordingly, when sufficient sack material is gathered between the rollers, the rollers separate, and switch is activated.

In a preferred embodiment, the grapple comprises a system of detectors or switches installed on the grapple to control its operation. Grapple 40 has three primary operational phases: (i) "Grab," ie., rotating the rollers inwardly, (ii) "Hold," ie., preventing the rollers from rotating in any direction, and (iii) "Release," ie., rotating the rollers outwardly. Depending on the application and sequence of operation, grapple 40 can be forced into any of the three phases. The logic of how the grapple is forced into a particular phase depends on how and where the grapple is being used. As would be apparent to one skilled in the art, the control system must consider many operational issues and safety concerns. A preferred embodiment of a control system is described herein.

A logic signal, $S_G$, is used to indicate the proximity of the grapple to a sack or an object to be grasped. In a preferred embodiment, a proximity detector is installed on the grapple which generates a signal ($S_G$ becomes 1) when the grapple is in close proximity to a sack or other object to be grasped. As would be apparent to one skilled in the art, there are many forms of a proximity detector available for use in the invention. For example, the proximity detector may be an optical system or a vision system, wherein control software is used to identify the closeness of the sack to the grapple. In another embodiment, in place of the proximity detector, an electro-mechanical switch is installed on the bottom of the grapple to issue a logic signal when the switch contacts the sack. Additionally, in another embodiment, e.g., when this grapple is used with a manual material-handling device, the $S_G$ signal may be issued by the operator at the push of a switch.

Figure 10A:
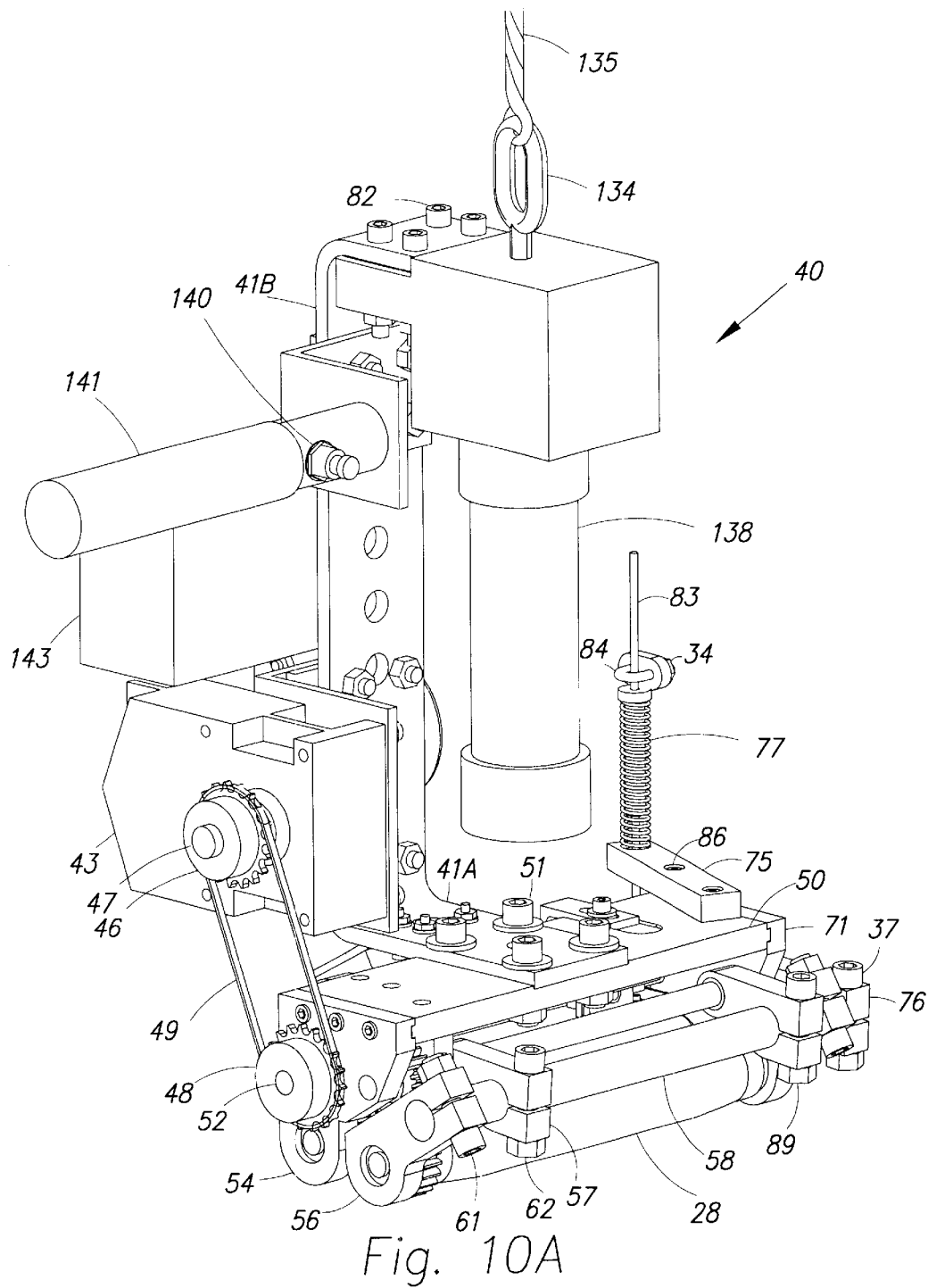
FIGS. 10A and 10B illustrate an embodiment of the grapple of the present invention used with the material-handling device shown in FIG. 9.
Figure 10B:
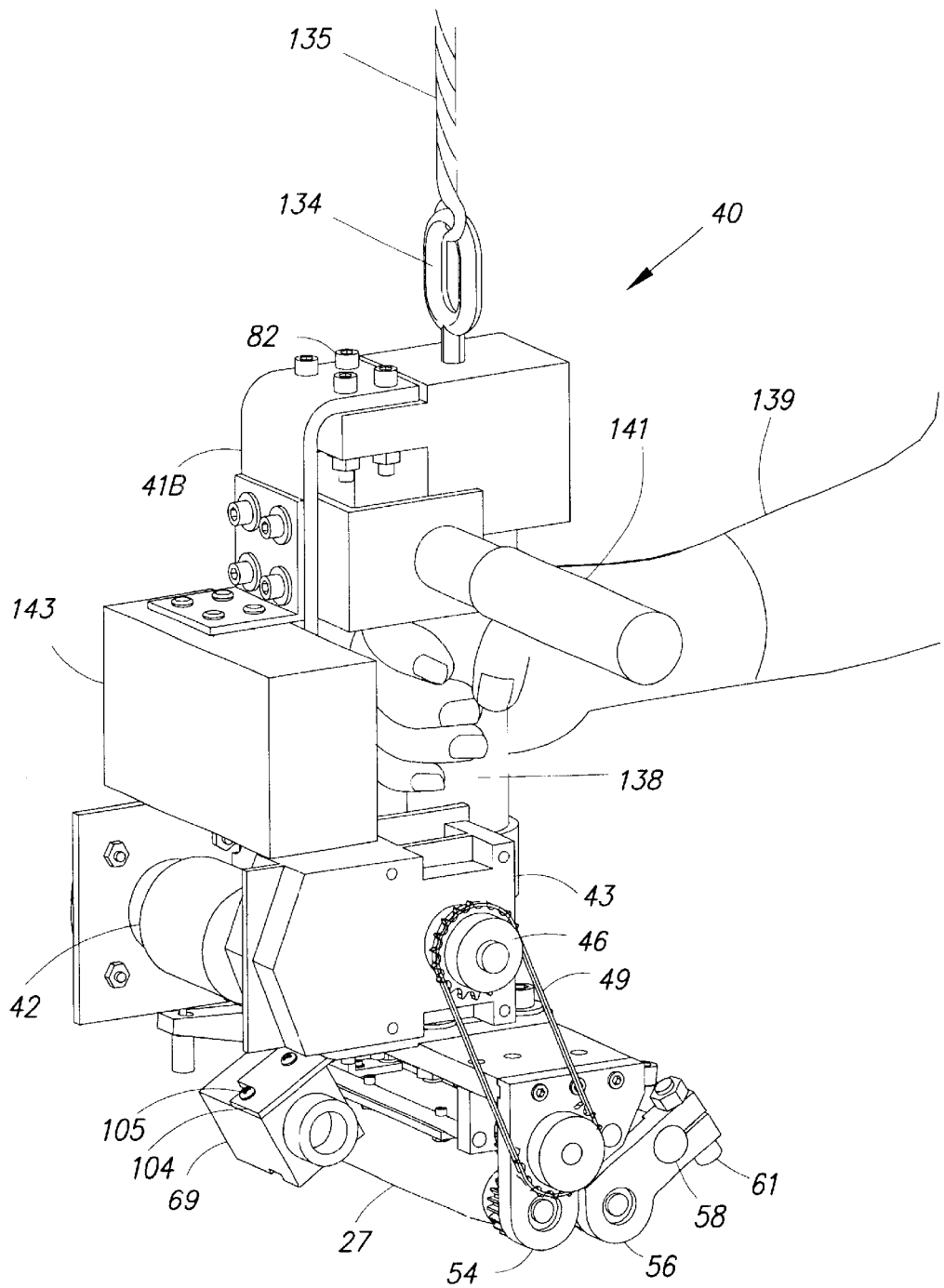

FIG. 3B and FIG. 10B illustrate one means for accomplishing a proximity detector to generate a $S_G$ signal. An electronic proximity detector 69 is used to detect the nearness of grapple 40 to an object to be grabbed or gripped. The proximity detector is disposed on the grapple to issue a $S_G$ signal when the object is detected within a predetermined distance. The predetermined distance is in the range of 1 inch to 50 inches, more preferably 6 inches to 18 inches and most preferred, as used in the exemplary embodiment, 12 inches. In FIGS. 3B and 10B, proximity detector 69 is installed on a detector mounting plate 104 via fasteners 105, and detector mounting plate 104 is rigidly connected to mounting bracket 41. Detector mounting plate 104 is configured to have an appropriate angle, so that the detector beam aims at the object or sack. The proximity detector 69 issues a $S_G$ signal ($S_G$ becomes 1) when the grapple is close to the object. The proximity detector used in this embodiment (e.g., manufactured by Banner Engineering Corp., Minneapolis, Minn.) sends a 5 VDC signal when an object is within 12 inches of the grapple. Alternatively, an electro-mechanical switch can be used as the proximity detector to generate the $S_G$ signal. Such electro-mechanical switch used as a proximity detector can be activated either by the operator or by its contact with the object.

Another logic signal, $S_R$, is issued when sufficient sack material has been dragged in between the rollers. In a preferred embodiment, an electro-mechanical switch, installed in grapple 40, sends a signal ($S_H$ becomes 1) when sufficient sack material has been dragged in between the rollers. This switch was described above in FIGS. 7A, 7B and 7C.

Finally, a third logic signal, $S_R$, is issued to release the sack. As apparent to one skilled in the art, this signal may be generated by various events. In one embodiment, the sack is released when the sack is placed on the floor, table or other desired surface. In another embodiment, the sack is released upon a command from a computer or from an operator. In a preferred embodiment of the invention, a momentary switch, pressed by the operator, issues a release signal. A momentary switch is a switch that shorts (or opens) a circuit as long as the switch is held pressed.

TABLE 1

| | $S_G$ | $S_H$ | $S_R$ | Grapple Phases |
|---|---|---|---|---|
| Row 1 | 0 | 0 | 0 | Hold |
| Row 2 | 0 | 0 | 1 | Release |
| Row 3 | 0 | 1 | 0 | Hold |
| Row 4 | 0 | 1 | 1 | Release |
| Row 5 | 1 | 0 | 0 | Grab |
| Row 6 | 1 | 0 | 1 | Release |
| Row 7 | 1 | 1 | 0 | Hold |
| Row 8 | 1 | 1 | 1 | Release |

Table 1 illustrates the operational phases of the grapple 40 for all possible combinations of the states of the three signals: $S_G$, $S_H$ and $S_R$. As shown on Table 1, there is only one combination of signals $S_G$, $S_H$ and $S_R$ which forces grapple 40 into the "Grab" phase. This combination is shown in row 5 of the table where $S_G$ is "1" (the grapple is close to the sack); $S_H$ is "0" (the sack is not completely grabbed) and $S_R$ is "0" (no command is issued to release the sack). As also shown on Table 1, there are three combinations (rows 1, 3 and 7) that force the grapple into the "Hold" phase. Row 1 indicates the operation of the grapple when; no sack is in the grapple, the grapple is not close to any sack, and no signal is issued for release of the sack. Row 3 and row 7 indicate that sufficient sack material is gathered between the rollers, therefore, the grapple holds the sack regardless of the state of $S_G$. The remaining combinations (rows 2, 4, 6, and 8) indicate the grapple is forced into the "Release" phase. The grapple is forced into the "Release" phase when $S_R$ is "1" regardless of the states of $S_G$ and $S_H$.

Using the three logic signals, the control system permits the device to operate in each operational phase. In the "Grab" phase of the grapple, rollers 27 and 28 are rotating inwardly to draw sack material into the grapple. In the "Release" phase rollers 27 and 28 are rotating outwardly to eject material from the grapple. However, as apparent to one skilled in the art, there are many methods of forcing the grapple into the "Hold" phase, ie., preventing the rollers from turning in either direction. In a preferred embodiment, shaft 60 rotates when brake 65, engaged by motor 42, is electrically powered and shaft 60 stops rotating when brake 65 is not electrically powered. The brake employs a spring to push its brake pad onto rotating shaft 60 when the brake coil is not electrically powered. When voltage is applied to the brake coil, brake 65 will disengage allowing shaft 60 to rotate. When the grapple is in the "Hold" phase, the power will be disconnected from the brake.

In another embodiment, in lieu of a brake, a closed loop position controller for the motor that drives the rollers is used. When the system is forced into "Hold" phase, a position controller controls the angular position of the rollers at their current positions and prevents the rollers from rotating in either direction. This approach, although more effective than shortening the terminals of the motor, might be relatively costly since it requires installation of the position sensors and feedback circuitry.

Yet another embodiment for preventing the rollers from turning in either direction is to use a ratchet mechanism to stop the rollers. The ratchet, when engaged, would allow for inward rotation of rollers 27 and 28 during the "Grab" mode, however it would prevent outward rotation. To release the sack, the ratchet would be disengaged, using a solenoid or manually, from the rollers for outward rotation of the rollers. As would be apparent to one skilled in the art, other means of locking or preventing the rollers from rotating are available.

Figure 8:
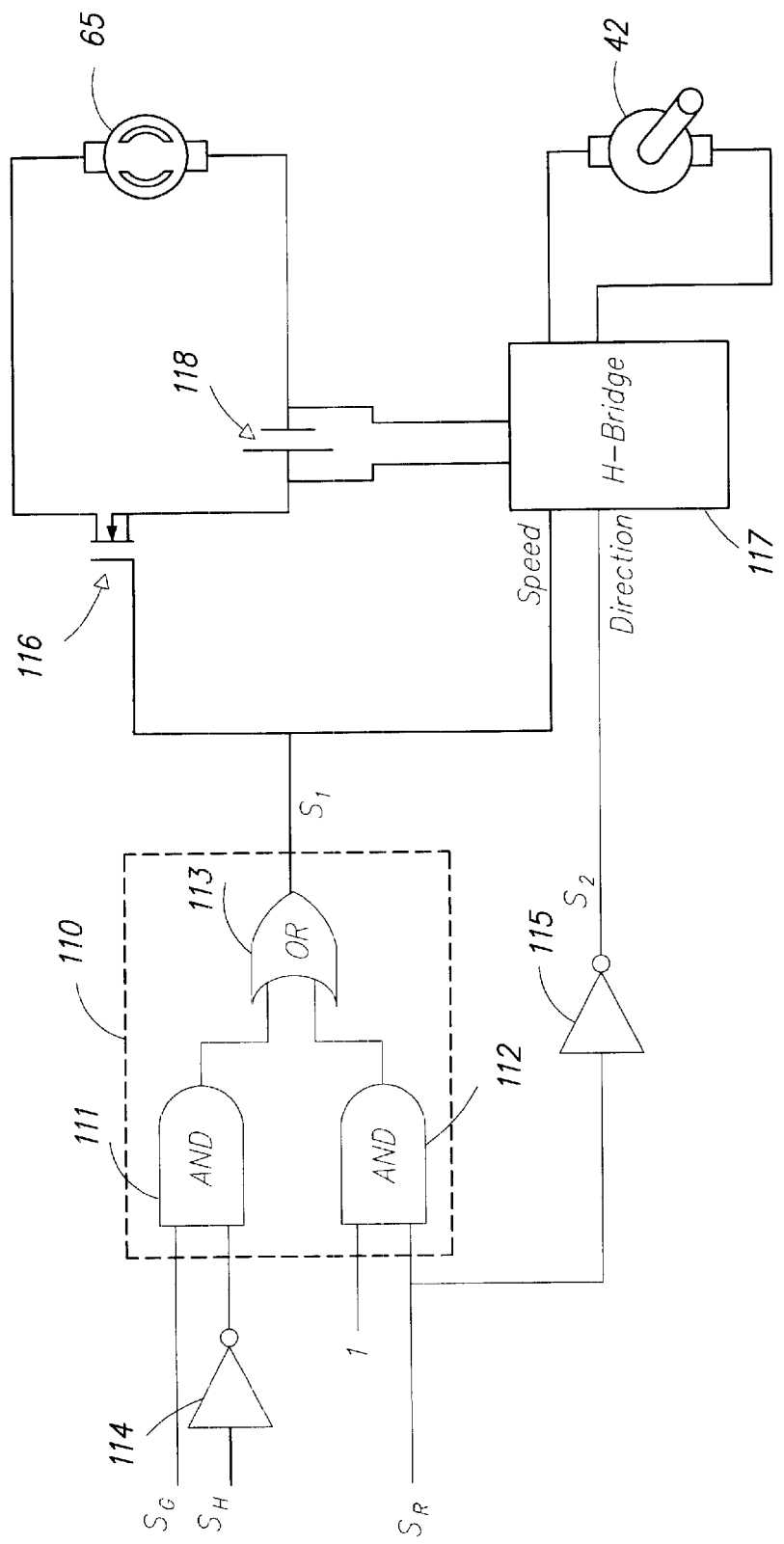
FIG. 8 schematically illustrates the control circuitry to create the operational phases of an embodiment of the present invention.

One embodiment for the control system was disclosed in U.S. patent application Ser. No. 09/755,496 pending. Another preferred embodiment is disclosed herein. FIG. 8 schematically illustrates a preferred embodiment of how the three signal sources, $S_G$, $S_H$ and $S_R$, are wired for accomplishing the events and operational phases shown in Table 1. A logic chip set 110 that contains OR and AND gates is used to generate an appropriate logic signal based on the states of the three signals: $S_G$, $S_H$ and $S_R$. Both $S_G$ and $S_R$ are connected to input pins of two AND gates 111 and 112 of logic chip 110. The $S_H$ signal is first inverted by an inverter gate 114 and then passed to AND gate 111. FIG. 8 shows two additional signals generated by inverter 115 and OR gate 113. Table 2 illustrates each combination of signals $S_G$, $S_H$, and $S_R$ along with signals $S_1$ and $S_2$ and the associated operational phase.

TABLE 2

|  | $S_G$ | $S_H$ | $S_R$ | $S_1$ | $S_2$ | Grapple Phases |
| --- | --- | --- | --- | --- | --- | --- |
| Row 1 | 0 | 0 | 0 | 0 | 1 | Hold |
| Row 2 | 0 | 0 | 1 | 1 | 0 | Release |
| Row 3 | 0 | 1 | 0 | 0 | 1 | Hold |
| Row 4 | 0 | 1 | 1 | 1 | 0 | Release |
| Row 5 | 1 | 0 | 0 | 1 | 1 | Grab |
| Row 6 | 1 | 0 | 1 | 1 | 0 | Release |
| Row 7 | 1 | 1 | 0 | 0 | 1 | Hold |
| Row 8 | 1 | 1 | 1 | 1 | 0 | Release |

Signal $S_1$ is tied to two power electronic components: a MOSFET 116 and an H-Bridge 117. MOSFET 116 acts like a switch; so that, as long as signal $S_1$ is low, i.e. $S_1=0$, no current flows from power supply 118 to brake 65. When signal $S_1$ is high, i.e. $S_1=1$, MOSFET 116 permits electric current flow from power supply 118 to brake 65. As discussed above, in a preferred embodiment, brake 65 is normally engaged and therefore, the brake permits rotation of driver sprocket 46 only when it is electrically powered. H-Bridge 117 is a power electronic chipset and is used to drive motor 42. Among its other pins, H-bridge 117 has two major input pins: "Speed" and "Direction." Both "Speed" and "Direction" pins are connected directly to $S_1$ and $S_2$. H-Bridge 117 has two output power terminals that connect directly to motor 42.

In addition to "Speed" and "Direction" input pins, H-bridge 117 has two other inputs that accept a larger voltage from power supply 118. In a preferred embodiment, a 12 VDC power supply 118 is used to power motor 42 and brake 65. When the "Speed" signal is high, the output terminals connected to motor 42 terminals get latched to power supply 118. When $S_1=0$, zero voltage will be latched on the motor terminals. In other words, the state of $S_1$ is used to send electric power to motor 42. The "Direction" signal controls the polarity of the voltage that gets connected to motor 42. The "high" and "low" states for the "Direction" signal indicate outward and inward rotations of the rollers respectively. In other words, when $S_2=1$, the motor is powered with a polarity, such that rollers 27 and 28 turn outwardly, and when $S_2=0$, motor is powered with an opposite polarity, such that rollers 27 and 28 turn inwardly.

As shown in FIG. 8 and Table 2, the grapple of this invention can be forced into any of the operational phases described in Table 2 depending on the combined signal conditions of signals $S_G$, $S_H$ and $S_R$. For example, if signal $S_R$ is activated, regardless of the states of $S_G$ and $S_H$, the "Speed" signal is high and the "Direction" signal is low. When the "Speed" signal is high, electric flow can pass through brake 65 and brake 65 is disengaged, and when "Direction" signal is low the rollers rotate outwardly. This indicates the "Release" phase (see Row 2, 4, 6 and 8 of Table 2).

If signal $S_G$ is activated while signals $S_R$ and $S_H$ are not activated, then the "Speed" signal and the "Direction" signal are high. When the "Speed" signal is high, electric current can pass through brake 65 and the brake is disengaged allowing the motor shaft to rotate. When the "Direction" signal is high the rollers rotate inwardly. This indicates "Grab" phase (see Row 5 of Table 2).

Finally, if signal $S_H$ is activated, regardless of the state of $S_G$, but as long as $S_R$ is not activated, then the "Speed" signal is low and MOSFET 116 will not permit current through brake 65. Moreover, the low state of the "Speed" signal assigns zero speed for motor 42. Therefore the brake is preventing the rotation of the motor and the system is in the "Hold" phase (see rows 1 and 7).

As described above, signal $S_R$ must be issued to release the object. As apparent to one skilled in the art, depending on the application, there are many ways of creating this logic signal upon a command from a computer or from an operator. Additionally, the grapple described in the present invention can be used with a variety of material-handling devices.

Figure 9:
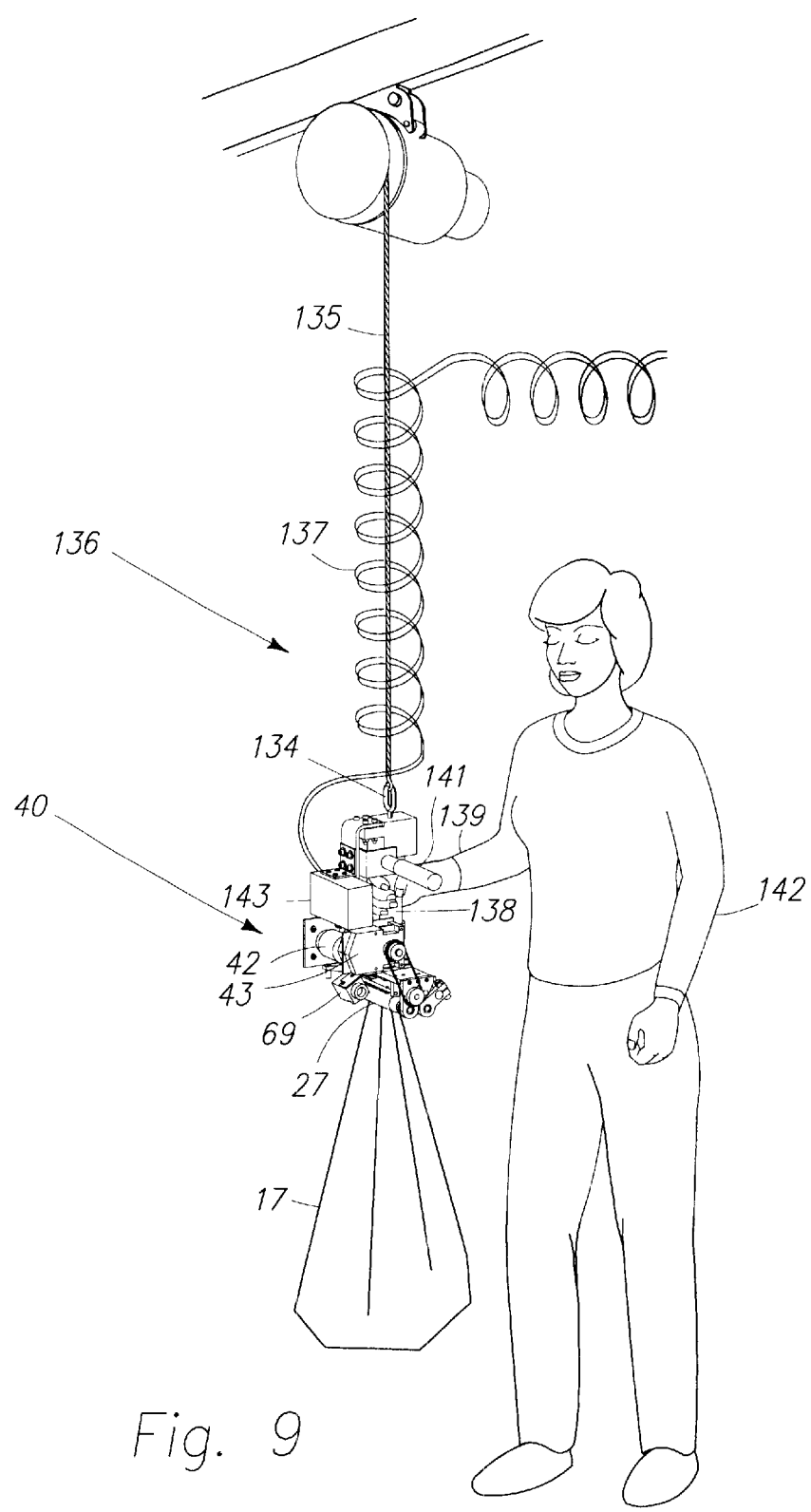
FIG. 9 illustrates a perspective view of an embodiment of the grapple of the present invention, wherein the grapple is installed on a manual material handling system and shown with an operator.

As first embodiment of the grapple 40 used with a first material-handling device, a hoist 136 is shown in FIG. 9. Such hoist devices are used often on auto assembly lines, in warehouses and similar situations to manipulate loads. Grapple 40 is connected to a line 135. The grapple is equipped with a handle, which is gripped by the human operator's hand 139 and contains a sensor. Using the measurement from the sensor, the hoists lift grapple 40. U.S. Pat. Nos. 5,915,673 and 5,865,426 describe some manual material handling devices and hoists that can be used with the present invention As shown in FIG. 9, a cord 137 brings electric power to operate the grapple's electrical components.

FIG. 10A and FIG. 10B are detailed views of grapple 40 when equipped to be used with a hoist 136. An eyelet 134 is used to hang grapple 40 from a line or cable 135. Handles 138 and 141 are installed on grapple 40 to be held by the operator's hands and include operator input devices that cause the vertical movement of grapple 40. A momentary switch 140 is installed on handle 141. When the operator 142 presses momentary switch 140, a $S_R$ signal is issued, and the sack is released. An enclosure 143 houses the electronics and control system of the present invention. Handles 138 and 141 are depicted herein as examples to demonstrate how the device can be interfaced with an operator. As apparent to one skilled in the art, there are many forms of interface available.

Figure 11:
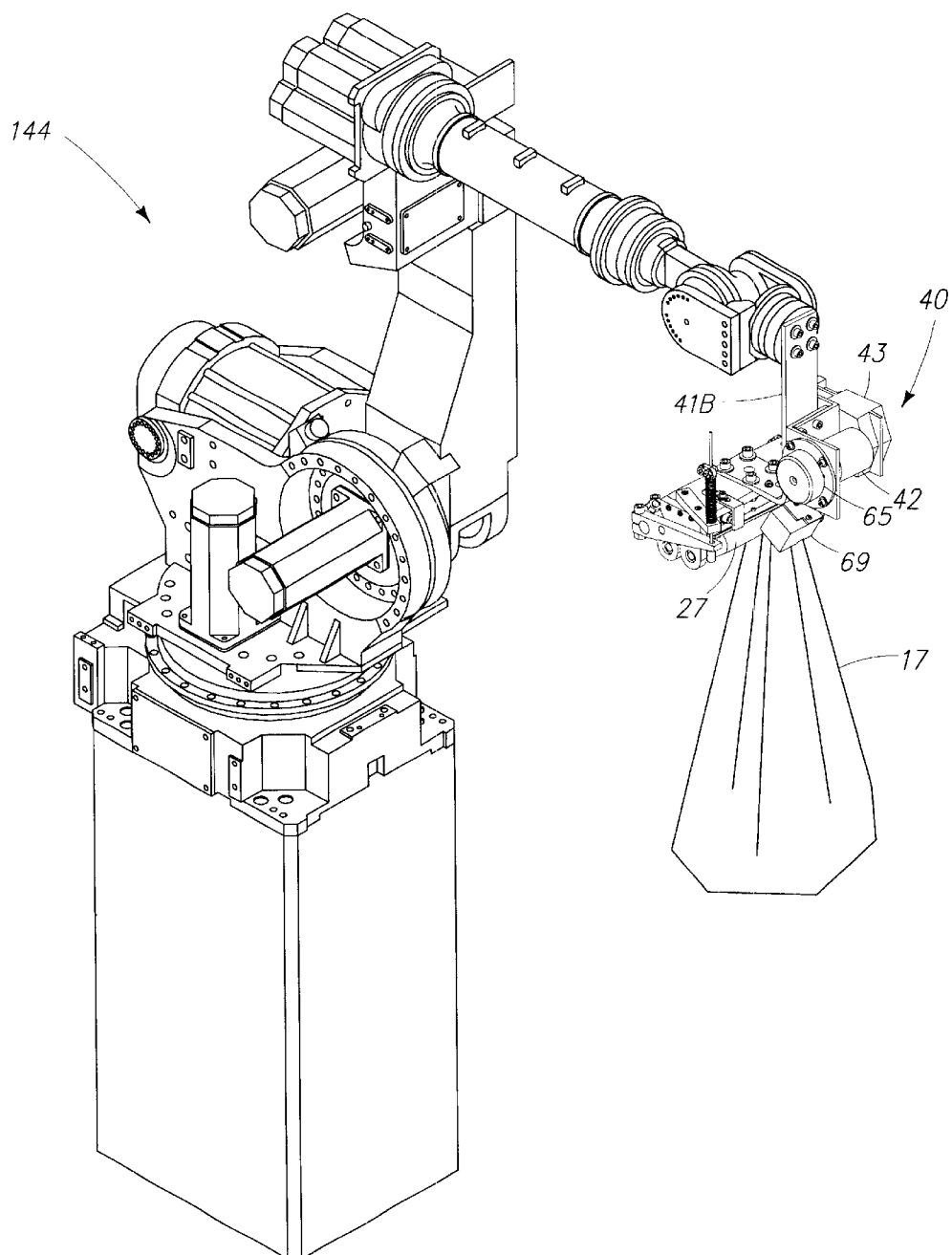
FIG. 11 illustrates a perspective view of an embodiment of the grapple of the present invention installed on a robot for grasping, lifting and maneuvering sacks.

A second embodiment where the grapple 40 is used with a second material-handling device, a robot 144, is shown in FIG. 11. The L shaped mounting bracket 41 is used to connect grapple 40 to robot 144. There is no manual switch in this case to issue the $S_R$ signal. The robot operating control system issues a $S_R$ signal when the sack reaches its target location.

Figure 12:
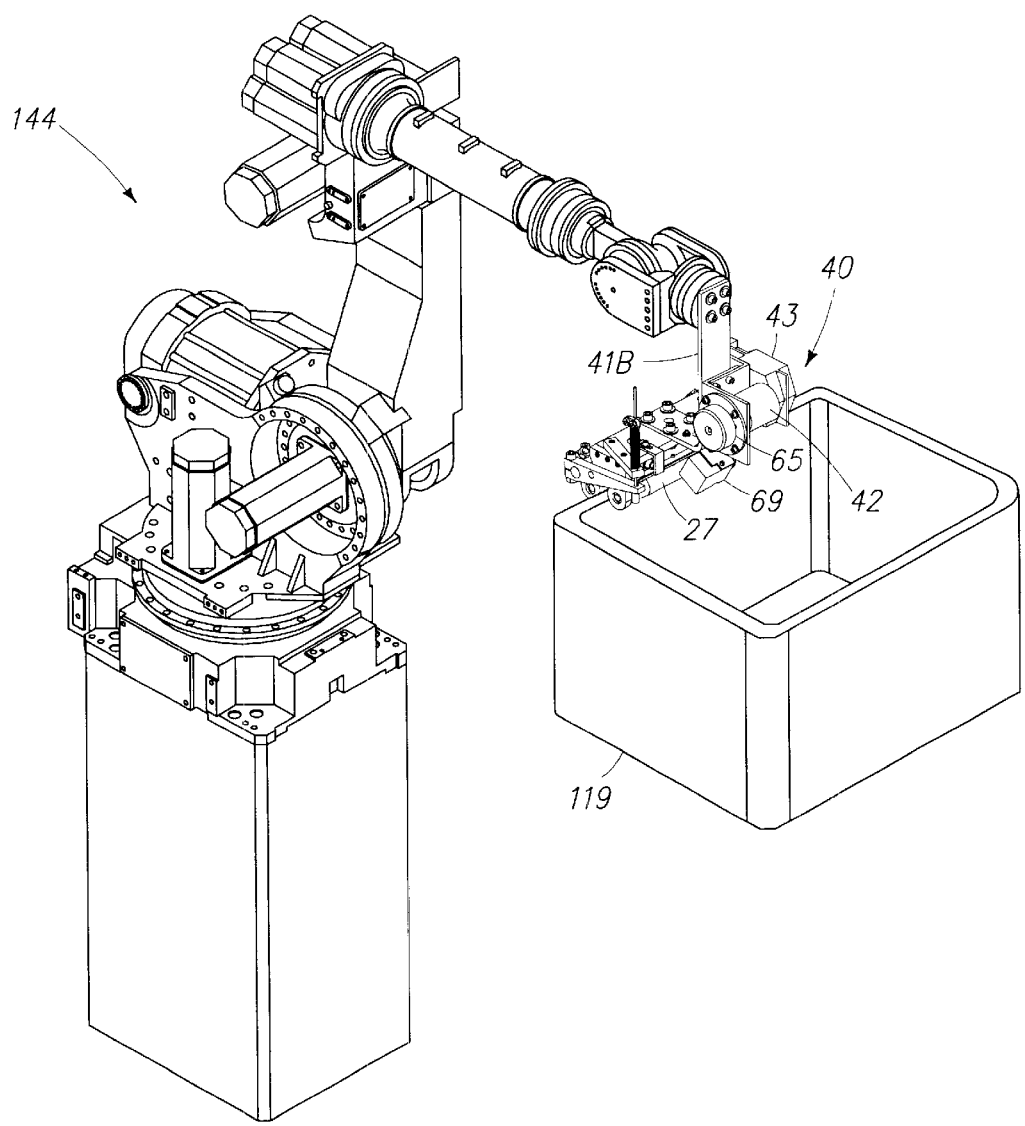
FIG. 12 illustrates a perspective view of an embodiment of the grapple of the present invention installed on a robot for grabbing a box.

In yet another embodiment, grapple 40 is used to grab letter bins as shown in FIG. 12. In general, boxes without any top cover can be grabbed by this grapple easily where the grapple rollers can grab a vertical edge of the box.

The required torque to keep the rollers stationary, i.e., when the sack material is dragged between the rollers and held when the rollers have stopped turning, is included in the present invention. When the sack is held between rollers 27 and 28 and the grapple is lifted, the total upward friction forces imposed on sack 17 by rollers 27 and 28 must be larger than the total of the maximum weight and the inertia force due to the maximum upward acceleration of the grapple as shown by inequality (1):

$$2\mu N_H \geq W_{max}(1+\alpha/g) \tag{1}$$

where g is the gravitational acceleration, $W_{max}$ is the weight of the heaviest sack to be lifted, $N_H$ is the normal force imposed by the rollers onto the sack material, $\mu$ is the coefficient of friction between the rollers and sack, and $\alpha$ is the maximum upward acceleration of the grapple induced by the robot or by other material handling devices. If inequality (1) is not satisfied, sack 17 will slide out of the grapple. Therefore, the grapple must be designed with a large enough $N_H$ and $\mu$ to guarantee that the heaviest sack to be lifted does not slide out of the rollers.

Additionally, the required torque imposed by the brake to keep gear 21 stationary is:

$$T_H = \mu N_H \left[ R_{27} \frac{n_{21}}{n_{22}} + R_{28} \frac{n_{21}}{n_{24}} \right] \tag{2}$$

where $R_{27}$ and $R_{28}$ are the radii of rollers 27 and 28 and $T_H$ is the holding torque that is imposed by the brake on gear 21. $n_x$ is the number of teeth on gear x. Comparing inequality (1) with equation (2) results in inequality (3) for the minimum holding torque on gear 21.

$$T_H \geq W_{max}\left(1 + \frac{\alpha}{g}\right)\left[R_{27}\frac{n_{21}}{n_{22}} + R_{28}\frac{n_{21}}{n_{24}}\right]\frac{1}{2} \tag{3}$$

If rollers 27 and 28 have equal radii, (i.e., $R_{27}=R_{28}$), then the number of teeth on both gears 22 and 24 should be equal to prevent slipping motion of the rollers relative to each other (i.e. $n_{22}=n_{24}$). The holding torque when rollers 27 and 28 have equal radii can be calculated from equation (4):

$$T_H \geq W_{max}\left(1 + \frac{\alpha}{g}\right) R_{27}\frac{n_{21}}{n_{22}} \tag{4}$$

In a preferred embodiment of this invention, both gears 21 and 22 have equal number of teeth and both rollers 27 and 28 have equal radii.

If the heaviest sack to be lifted by a particular grapple is 70 pounds (a sack or object containing weight is referred to as a "weighted" sack or object), and the maximum maneuvering acceleration is 0.3 g, then if the rollers radii is 0.7" and $n_{21}=n_{22}$, according to inequality (4), one must impose at least 63.7 lbf-inch torque on gear 21 during the "Hold" phase.

Accordingly, if a brake is used to create holding torque, brake 65 and the speed reducer transmission 43 (FIGS. 3A and 3B) must have enough holding torque on gear 21. Therefore, if the ratio of the angular speed of the transmission input shaft 52 (motor output shaft) to the angular speed of gear 21 is N, the minimum required brake torque, $T_B$, is N times smaller than $T_H$. As should be apparent to one skilled in the art, a brake should have additional torque capacity to compensate for inefficiencies and uncertainties in various components of the grapple. In a preferred embodiment of this invention N=36, $n_{21}=n_{22}$ and rollers 27 and 28 have equal radii.

Additionally, the holding torque of a brake is a function of the stiffness of the spring that is installed in the brake. The stiffer the spring of the brake, the more holding torque can be generated. Although more holding torque during the "Hold" phase assures that heavier sacks can be lifted, a brake with a stiff spring and consequently large holding torque requires a large amount of electric current to disengage. Thus, enough electric current must be available in the electric power supply to feed the brake. In a preferred embodiment of this invention, a normally engaged brake (e.g., manufactured by Inertia Dynamics, Collinsville, Conn.) was used. This brake uses 0.477 Amp at 12 VDC to disengage. By normally engaged brake is meant that the brake does not allow any rotation for the motor shaft when the brake is not electrically powered. The holding torque for the brake, when the brake is not energized electrically, is 7 lbf-inch Since the transmission ratio is 36, the holding torque on gear 21 will be 252 lbf-inch.

As discussed earlier, rather than using a brake, one can use other mechanisms, e.g. a ratchet, to lock gear 21 during the "Hold" phase. Any locking systems, such as locking ratchets, must guarantee that the required torque on gear 21 during the "Hold" phase can be generated by the locking system.

In addition to generating enough torque to hold gear 21, thereby holding the sack material and preventing the sack from falling from between the rollers, motor 42 and its speed reducer transmission 43 (FIGS. 3A and 3B) must generate enough torque on gear 21 to guarantee that the rollers turn and bring enough sack material between the rollers should the sack starts to slide out of the area between the rollers. This means that the required torque, $T_G$, generated by the motor 42 and speed reducer transmission 43 on gear 21 should be at least equal to the torque calculated from equality (2):

$$T_G \geq \mu N_H \left[ R_{27}\frac{n_{21}}{n_{22}} + R_{28}\frac{n_{21}}{n_{24}} \right] \tag{5}$$

Or $$T_G \geq W_{max}\left(1 + \frac{\alpha}{g}\right)\left[R_{27}\frac{n_{21}}{n_{22}} + R_{28}\frac{n_{21}}{n_{24}}\right]\frac{1}{2} \tag{6}$$

Of course if rollers have equal radii, inequality (6) leads to inequality (7):

$$T_G \geq W_{max}\left(1 + \frac{\alpha}{g}\right) R_{27}\frac{n_{21}}{n_{22}} \tag{7}$$

In a preferred embodiment of this invention, an electric motor and a transmission system with 70 lbf-in steady state output torque was used. As would be apparent to one skilled in the art, the motor must have more torque capacity than is needed to compensate for inefficiencies and uncertainties in various components of the grapple. Also, as apparent to one skilled in the art, the motor and the transmission must be able to provide more torque, for a short time, to accommodate for the transient inertia torque due to acceleration of rotating elements of the grapple.

The radii of the rollers is in the range of 0.3 inches to 12 inches, more preferably in the range of 0.5 inches to 1.5 inches, and most preferably, as shown in the exemplary embodiment, 0.7 inches. The angular speed is in the range of 2 to 2000 RPM, more preferably 100 to 300 RPM, and most preferably, as shown in the exemplary embodiment, 180 RPM (3 revolutions/second). In a preferred embodiment, e.g. grasping USPS sacks, rollers with a radii of 0.7 inches should turn with the speed of about 3 revolutions/second for optimal operation. Small angular speeds for the rollers yield a slow grabbing process, while too high a speed of rotation for the rollers may not permit the rollers to engage and grab the sacks. If the angular speed of the gear 21 is ω revolution/seconds, the required motor power is:

$$\text{Power} = \frac{T_G \omega}{1050} \text{ HP} \quad (8)$$

$$\text{Power} = \frac{T_G \omega}{1.4} \text{ Watt} \quad (9)$$

Where the unit of $T_G$ is lbf-inch and ω is in revolution/second. Substituting $T_G$=70 lbf-inch and ω=3 rev/sec into equations (8) and (9) results in 0.2 HP or 150 Watt for the electric motor at 3 revolution/second (180 RPM). In the preferred embodiment of the present invention, $n_2=n_{22}$, and therefore gear 21 and the rollers turn at the same angular speeds. The above analysis also yields a size for the required current if an electric motor is used to impose torque on gear 21. For example, if a DC power supply, with the voltage V, is used to power motor 42, then the required current by the motor is (10).

$$I_M \geq \frac{T_G \omega}{1.4 \text{ V}} \text{ Amp} \quad (10)$$

If a 12VDC power supply is used to power the motor, then the minimum current drawn by the motor is 12.5 Amp. If both the motor and the brake are powered with the same power supply, the required current for the brake needs to be supplied in addition to the required current for the motor.

Several design factors must be considered associated with the friction between the rollers and the sack material. For instance, a large coefficient of friction between the rollers and the sack material can be achieved in many ways. First, the rollers may be knurled. Knurling is a process of putting a grip or roughened surface on a roller. The die, which is engraved with a female impression of the design, is pressed against the roller and sufficient pressure is applied to produce the desired depth of impression. Knurl rollers are attractive, but may damage the sacks.

Another method of creating friction is to wrap the rollers with a rubber or rubber-like material that has a large coefficient of friction. However, rubber with a large coefficient of friction is soft and usually wears off quickly. Thus, in a preferred embodiment of the present invention, the grapple is designed with replaceable rollers.

Inequality (1) shows that large values for the coefficient of friction, μ, and for the normal force, $N_H$ allow the grapple to lift heavy sacks. However, there is a trade-off that must be considered. Large values for $N_H$ and μ require high torque actuators as shown by Equation (5). Thus, using a large $N_H$ and μ to guarantee inequality (1), requires a large actuator to overcome the friction forces between the rollers. For example, stiff springs create large normal force $N_H$ between the rollers and the sack material and a soft rubber surface on rollers creates a large coefficient of friction between the rollers and the sack material. Consequently, the values for the spring stiffness and rubber coefficient of friction are selected so that inequality (1) is satisfied with a reasonable margin. Over designed systems (i.e., very a large μ and $N_H$) will lead to an unnecessarily large actuator and power supply. On the other hand, if the bias spring 77 is not stiff enough to generate a sufficiently large $N_H$ to satisfy inequality (1), the rollers will not be pushed against or oppose each other sufficiently, and the sack will slide out.

Once an optimal material, such as a rubber substance with an adequate coefficient of friction and a reasonable life expectancy, is chosen for the rubber on the rollers, a spring is selected with the proper stiffness for the grapple to yield an appropriate normal force to satisfy inequality (1). In general, a large coefficient of friction for rubber requires softer springs, and a small coefficient of friction requires stiffer springs. In a preferred embodiment of the present invention, low durometer Neoprene, with μ=1, is used and the pre-load of the spring is adjusted to yield 50 lbf between the rollers to satisfy inequality (1) with a reasonable margin. If the heaviest sack to be lifted by a particular grapple is 70 pounds and the maximum maneuvering acceleration is 0.3 g then inequality (2) will be satisfied as shown below:

$$2 \times 1 \times 50 \geq 70 \left(1 + \frac{0.3g}{g}\right) \quad (11)$$

or $$100 \geq 91 \quad (12)$$

Each and every patent, patent application and publication that is cited in the foregoing specification is herein incorporated by reference in its entirety.

Although particular embodiments of the invention are illustrated in the accompanying drawings and described in the foregoing detailed description, it is understood that the invention is not limited to the embodiments disclosed, but is intended to embrace any alternatives, equivalents, modifications and/or arrangements of elements falling within the spirit and scope of the invention as defined by the following claims. For example, while many of the embodiments described above are for lifting a sack, these embodiments can also be used for lifting other types of loads.

The following claims are intended to cover all such modifications and alternatives.

What is claimed is:

1. A mechanical grapple device for manipulating an object, comprising:

a supporting bracket assembly mountable to a transport mechanism;

a first roller, having a roller axis, the roller rotatably mounted on the supporting bracket assembly, and the first roller being rotatable about its axis, wherein the first roller further comprises a gripping surface for engaging and dragging a graspable portion of the object;

a second roller, having a roller axis, and the second roller being rotatable about its axis, wherein the second roller further comprises a gripping surface for engaging and dragging the graspable portion of the object;

a left pivoting bracket assembly and a right pivoting bracket assembly connected to the supporting bracket assembly, wherein the left and right pivoting bracket assemblies have an axis of rotation and rotatably hold the second roller;

a biasing means to bias the rollers toward each other with sufficient force to facilitate holding the graspable portion of the object in place between the rollers;

a first gear rigidly connected to the axis of the first roller;

a second gear rigidly connected to the axis of the second roller;

a third gear rotatably mounted on the supporting bracket assembly, wherein the third gear mates with the first gear;

a fourth gear, rotatably mounted on the supporting bracket assembly, wherein the fourth gear mates with both the second and third gears and has the same axis of rotation as the left and right pivoting bracket assemblies; and a drive means for rotating the third gear, wherein, when the drive means rotates the third gear in a first direction, the first roller and the second roller rotate in opposite directions, and when the gripping surface of the first roller is placed into contact with the graspable portion of the object, the first roller gripping surface draws the graspable portion of the object into a region between the first and the second rollers, thereby grasping the object.

2. The device according to claim 1, wherein, when the drive means rotates the third gear in a second direction, the first roller and the second roller turn outwardly in opposing rotations, releasing the object.

3. The device according to claim 1, wherein the supporting bracket assembly is mounted to the transport mechanism by a mounting bracket.

4. The device according to claim 1, wherein the left and right pivoting bracket assemblies further comprise a first clamping bracket and a second clamping bracket, wherein the first clamping bracket comprises a first end rotatably connected to the supporting bracket assembly and a second end attached to the first end of the second clamping bracket, and wherein the second end of the second holding bracket rotatably holds the second roller.

5. The device according to claim 1, wherein the drive means comprises an electrically powered motor.

6. The device according to claim 5, wherein the drive means further comprises a power transmission system to transmit the power from the motor to rotate the third gear.

7. The device according to claim 6, wherein the power transmission system further comprises: a speed reducer transmission coupled to the motor, a driver sprocket connected to the speed reducer transmission, a driven sprocket connected to rotate the third gear and a chain connecting the driver and driven sprockets.

8. The device according to claim 1, further comprising a holding means selectively operable to releasably engage at least one of the rollers, and prevent rotation of the roller when engaged, so that when the graspable portion of the object is located in the region between the rollers and when the holding means is engaged, the contact between the graspable portion of the object and the first and second rollers causes the object to be held by the device.

9. The device according to claim 8, wherein the holding means for preventing the rotation of the rollers is a brake.

10. The device according to claim 1, wherein the biasing means is a spring.

11. The device according to claim 1, wherein the material covering the gripping surface of the rollers has a high coefficient of friction.

12. The device according to claim 11, wherein the material is rubber.

13. The device according to claim 1, further comprising a control system which controls in the device three operational phases: grab, hold, and release.

14. The device according to claim 13, further comprising a signal generating element that generates a signal when the device is close to an object.

15. The device according to claim 14, wherein the signal generating element is a proximity switch, which issues a signal when the device is close to the object.

16. The device according to claim 13, further comprising a signal generating element that generates a signal when a sufficient portion of the graspable portion of the object is collected between the rollers.

17. The device according to claim 16, wherein the signal generating element is an electro-mechanical switch.

18. The device according to claim 13, further comprising a signal generating element that generates a signal to release the object.

19. The device according to claim 18, wherein the signal generating element is a momentary switch pressed by the operator.

20. The device according to claim 1, wherein the object is a deformable object.

21. The device according to claim 20, wherein the deformable object is a weighted sack or bag.

22. A method of manipulating an object comprising;

mounting a grapple device to a transport mechanism, wherein the grapple device further comprises (i) a supporting bracket assembly (ii) a first roller, having a roller axis, the roller rotatably mounted on the supporting bracket assembly, and the first roller being rotatable about its axis, wherein the first roller further comprises a gripping surface for engaging a graspable portion of the object, (iii) a second roller, having a roller axis, and the second roller being rotatable about its axis, wherein the second roller further comprises a gripping surface for engaging the graspable portion of the object, (iv) a left pivoting bracket assembly and a right pivoting bracket assembly connected to the supporting bracket assembly, having a axis of rotation and rotatably holding the second roller, (v) a biasing means to bias the rollers toward each other with sufficient force to facilitate holding the graspable portion of the object in place between the rollers, (vi) a first gear rigidly connected to the axis of the first roller, (vii) a second gear rigidly connected to the, axis of the second roller, (viii) a third gear, rotatably mounted on the supporting bracket assembly, wherein the third gear mates with the first gear, (ix) a fourth gear, rotatably mounted on the supporting bracket assembly, wherein the fourth gear mates with both the second and third gears and has the same axis of rotation as the left and right pivoting bracket assemblies, and (x) a driving means for rotating the third gear;

positioning the grapple device close to the object;

activating the grapple device, wherein the driving means rotates the third gear in a first direction, such that the first roller and the second roller rotate in opposite directions, and when the roller surface of the first roller contacts the object, a graspable portion of the object is drawn between the first and the second rollers, thereby grasping the object;

stopping the rotation of the rollers automatically when a sufficient portion of the object is grabbed between the rollers, thereby holding the object;

maneuvering the grapple device and object, via the transport mechanism, to the desired location; and releasing the object from the grapple device by a release mechanism, wherein the driving means rotates the third gear in a second direction, the first roller and the second roller turn outwardly in opposing rotations.

23. The method according to claim 22, further comprising releasably engaging at least one of the rollers to prevent rotation of the roller when engaged, so that when the graspable portion of the object is located between the rollers, the contact between the graspable portion of the object and the first and second rollers causes the object to be held by the device.

24. The method according to claim 22, further comprising generating a signal when the device is close to an object.

25. The method according to claim 22, further comprising generating a signal when a sufficient portion of the graspable portion of the object is collected between the rollers.

26. The method according to claim 22, further comprising generating a signal to release the object.

27. The method according to claim 22, wherein the object is a deformable object.

28. The method according to claim 27, wherein the deformable object is a weighted sack or bag.

* * * * *